United States Patent
Kang et al.

(10) Patent No.: US 9,900,495 B2
(45) Date of Patent: Feb. 20, 2018

(54) CAMERA MODULE AND AUTO FOCUSING METHOD THEREOF

(71) Applicant: LG ELECTRONICS INC., Seoul (KR)

(72) Inventors: Hyungjoo Kang, Seoul (KR); Sungdu Kwon, Seoul (KR); Youngman Kwon, Seoul (KR); Jayong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/591,393

(22) Filed: May 10, 2017

(65) Prior Publication Data

US 2017/0332004 A1    Nov. 16, 2017

(30) Foreign Application Priority Data

May 10, 2016 (KR) .................. 10-2016-0057226

(51) Int. Cl.

| H04N 5/232 | (2006.01) |
| G02B 7/09 | (2006.01) |
| G02B 7/28 | (2006.01) |
| H02K 33/18 | (2006.01) |
| H02K 11/21 | (2016.01) |
| H02K 11/30 | (2016.01) |

(52) U.S. Cl.
CPC .......... H04N 5/23212 (2013.01); G02B 7/09 (2013.01); G02B 7/28 (2013.01); H02K 11/21 (2016.01); H02K 11/30 (2016.01); H02K 33/18 (2013.01)

(58) Field of Classification Search
CPC .... H04N 5/23212; H02K 11/21; H02K 11/30; H02K 33/18; G02B 7/09; G02B 7/28
See application file for complete search history.

(56) References Cited

U.S. PATENT DOCUMENTS

| 6,154,611 A | 11/2000 | Washisu |
| 7,620,305 B2 | 11/2009 | Noji |

(Continued)

FOREIGN PATENT DOCUMENTS

| CN | 101236285 | 8/2008 |
| JP | 59231745 | 12/1984 |

(Continued)

OTHER PUBLICATIONS

Chinese Office Action in Chinese Application No. 201580000181.0, dated Mar. 29, 2017, 21 pages (with English translation).

(Continued)

*Primary Examiner* — Tuan Ho
(74) *Attorney, Agent, or Firm* — Fish & Richardson P.C.

(57) ABSTRACT

The present invention includes a fixed unit having a perforated hole formed therein, a movable unit including at least one lens, the movable unit configured to linearly move in the perforated hole of the fixed unit, a movable coil disposed on a surface of the movable unit, and a fixed coil disposed on a surface of the fixed unit, the fixed coil configured to receive from the movable coil an induced current or voltage according to a distance from the movable coil, wherein the movable coil receives a current or a voltage via a first wiring and a second wiring for moving the movable unit, and wherein the fixed coil outputs a current or a voltage via a third wiring and a fourth wiring based on the received induced current or voltage from the movable coil.

28 Claims, 25 Drawing Sheets

(56) References Cited

U.S. PATENT DOCUMENTS

| | | | |
|---|---|---|---|
| 7,684,685 B2 | 3/2010 | Takahashi | |
| 7,925,148 B2 | 4/2011 | Choi et al. | |
| 8,190,014 B2 | 5/2012 | Tsuda et al. | |
| 8,531,534 B2* | 9/2013 | Hu | G02B 7/08 348/208.11 |
| 8,743,218 B2 | 6/2014 | Tsuchida | |
| 8,896,749 B2 | 11/2014 | Kudo | |
| 9,134,503 B2 | 9/2015 | Topliss | |
| 9,423,631 B2* | 8/2016 | Cho | G02B 13/0015 |
| 2003/0081137 A1 | 5/2003 | Yamazaki | |
| 2004/0174614 A1 | 9/2004 | Hovanky | |
| 2005/0265705 A1 | 12/2005 | Uenaka | |
| 2007/0159010 A1 | 7/2007 | Su et al. | |
| 2007/0285522 A1 | 12/2007 | Kimura | |
| 2008/0297922 A1 | 12/2008 | Lule | |
| 2009/0003818 A1 | 1/2009 | Park et al. | |
| 2009/0022487 A1 | 1/2009 | Weng et al. | |
| 2010/0033616 A1 | 2/2010 | Huang et al. | |
| 2010/0060774 A1* | 3/2010 | Azuma | G02B 7/025 348/335 |
| 2010/0142937 A1 | 6/2010 | Chen et al. | |
| 2011/0122268 A1 | 5/2011 | Okamoto et al. | |
| 2011/0261248 A1 | 10/2011 | Matsuda | |
| 2011/0286099 A1 | 11/2011 | Shiraki et al. | |
| 2012/0081559 A1* | 4/2012 | Sato | G03B 5/00 348/208.11 |
| 2012/0092768 A1 | 4/2012 | Shiraki et al. | |
| 2012/0120492 A1 | 5/2012 | Sato | |
| 2013/0215511 A1 | 8/2013 | Wu et al. | |
| 2013/0215525 A1 | 8/2013 | Wang et al. | |
| 2014/0009631 A1 | 1/2014 | Topliss | |
| 2014/0098421 A1 | 4/2014 | Umezu | |
| 2014/0118601 A1 | 5/2014 | Myung | |
| 2015/0207983 A1 | 7/2015 | Kang et al. | |
| 2015/0365568 A1 | 12/2015 | Topliss et al. | |

FOREIGN PATENT DOCUMENTS

| | | |
|---|---|---|
| JP | 60049309 | 3/1985 |
| JP | H01206861 | 8/1989 |
| JP | 05196983 | 8/1993 |
| JP | 09033792 | 2/1997 |
| JP | 2000295831 | 10/2000 |
| JP | 2009271204 | 11/2009 |
| JP | 2010164638 | 7/2010 |
| JP | 2010204429 | 9/2010 |
| JP | 2012088477 | 5/2012 |
| JP | 2012128390 | 7/2012 |
| JP | 2012177754 | 9/2012 |
| KR | 10-2008-006722 | 1/2008 |
| KR | 10-2010-0039925 | 4/2010 |
| KR | 10-2012-0117236 | 10/2012 |
| KR | 10-2013-0029631 | 3/2013 |
| KR | 10-2013-0071000 | 6/2013 |
| KR | 10-2015-0080710 | 7/2015 |
| KR | 10-2015-0097998 | 8/2015 |
| KR | 10-2016-0020692 | 2/2016 |
| WO | 2015111884 | 7/2015 |

OTHER PUBLICATIONS

Extended European Search Report in European Application No. 15740339.5, dated May 26, 2017, 14 pages (with English translation).

International Search Report in International Application No. PCT/2015/000513, dated Apr. 30, 2015, 7 pages (with English translation).

International Search Report in International Application No. PCT/KR2017/002591, dated Aug. 7, 2017, 16 pages (with English translation).

International Search Report in International Application No. PCT/KR2017/004720, dated Aug. 8, 2017, 11 pages (with English translation).

U.S. Office Action in U.S. Appl. No. 15/455,040, dated May 15, 2017, 13 pages.

U.S. Notice of Allowance in U.S. Appl. No. 14/601,850, dated Aug. 12, 2016.

U.S. Notice of Allowance in U.S. Appl. No. 15/455,060, dated Jul. 6, 2017, 9 pages.

U.S. Office Action in U.S. Appl. No. 15/455,018, dated May 16, 2017, 14 pages.

Extended European Search Report in European Application No. 17170156.8, dated Sep. 19, 2017, 10 pages (with English translation).

U.S. Notice of Allowance in U.S. Appl. No. 15/455,018, dated Sep. 18, 2017, 8 pages.

* cited by examiner

CAMERA MODULE AND AUTO FOCUSING METHOD THEREOF

This application claims priority under 35 U.S.C. § 119 to Korean Application No. 10-2016-0057226, filed in Korea on 10 May 2016 which is hereby incorporated in its entirety by reference as if fully set forth herein.

BACKGROUND OF THE INVENTION

Field of the Invention

The present invention relates to a camera module, and more particularly, to a camera module including a voice coil motor actuator and auto focusing method thereof.

Discussion of the Related Art

Owing to the recent technical developments, multi-functional mobile terminals having various functions intensively integrated therein are released and mobile terminals tend to be downsized and lightened to fit the mobile environments despite functional complexity and diversity.

Therefore, a camera module installed in a mobile terminal such as a mobile phone, a laptop or the like tends to be downsized owing to the ultra-downsizing and ultra-precision of lenses.

An optical system of a camera module needs an auto-focus function to have a clear view of a target object that becomes a subject.

Such an auto-focus function uses actuators of various types in order to move a lens module to an optical focal position. And, performance of an auto-focus of a camera module can vary according to property of an actuator configured to transport a lens module.

Auto-focus actuators can include actuators of various types such as a voice coil motor (VCM) actuator, a piezo-electrically driven actuator, an MEMs actuator driven by static capacitance and the like.

With respect to a camera module that employs a voice coil motor actuator, permanent magnet is located at a fixing part of the camera module and a coil is attached to a lens module to be driven, whereby a magnetic circuit is configured. Hence, a lens module is driven by Lorenz Force that flows through the coil.

Thus, the camera module of the voice coil motor type extracts a difference of a magnetic flux value according to displacement of the lens module using a hole sensor, thereby calculating an optimal auto-focus value of the lens module.

However, such a camera module of a voice coil motor type should connect 4 power sources to a hole sensor, it has problem of a difficult manufacturing process.

Namely, in the camera module of the voice coil motor type, since at least 6 connectors including 2 connectors for electric connection to a coil located at the lens module and 4 connectors for electric connection to the hole sensor should be configured in the camera module, it is difficult to design such a camera module and the manufacturing process has many difficulties.

Moreover, with respect to the camera module of the voice coil type that uses the hole sensor, it takes a considerable time to move the lens module to an optimal position of auto focus and an auto-focus position error of the lens module may be generated due to hysteresis properties, structural friction properties and the like.

SUMMARY OF THE INVENTION

Accordingly, embodiments of the present invention are directed to a camera module and auto focusing method thereof that substantially obviate one or more problems due to limitations and disadvantages of the related art.

One object of the present invention is to provide camera module and auto focusing method thereof, by which an auto focus position can be found quickly and accurately in a manner of disposing a fixed coil to a fixed unit, disposing a movable coil to a moving unit, and then detecting a displacement value of current or voltage according to a distance between the fixed coil and the movable coil.

Another object of the present invention is to provide camera module and auto focusing method thereof, by which an electrical connection between a coil including a fixed coil and a movable coil and a circuit board can be simplified using a spring connected between a fixed unit and a movable unit.

Another object of the present invention is to provide camera module and auto focusing method thereof by which the camera module can be downsized in a manner of reducing overall thickness of the camera module by disposing a fixed coil within a holder groove of a fixed unit.

Another object of the present invention is to provide camera module and auto focusing method thereof; by which the camera module can be downsized in a manner of reducing overall thickness of the camera module by disposing a fixed coil within a circuit board.

Another object of the present invention is to provide camera module and auto focusing method thereof, by which a minimum interval between a movable coil and a fixed coil is maintained to prevent a reduction of a displacement value of current or voltage according to a distance and to find an accurate auto focus position.

Another object of the present invention is to provide camera module and auto focusing method thereof, by which auto focus can be performed by one of a contrast focus scheme, a laser focus scheme and a hybrid focus scheme according to a user request or external brightness.

Further object of the present invention is to provide camera module and auto focusing method thereof, which reduces natural oscillation of a spring by disposing a damper between the spring and a fixed unit, whereby error of auto focus can be prevented and auto focus time can be reduced.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a camera module according to one embodiment of the present invention may include a fixed unit having a perforated hole formed therein, a movable unit including at least one lens, the movable unit configured to linearly move inside the perforated hole of the fixed unit, a movable coil disposed on a surface of the movable unit, and a fixed coil disposed on a surface of the fixed unit, the fixed coil configured to receive from the movable coil an induced current or voltage according to a distance from the movable coil, wherein the movable coil receives a current or a voltage via a first wiring and a second wiring for moving the movable unit, and wherein the fixed coil outputs a current or a voltage via a third wiring and a fourth wiring based on the received induced current or voltage from the movable coil.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Figure 1:
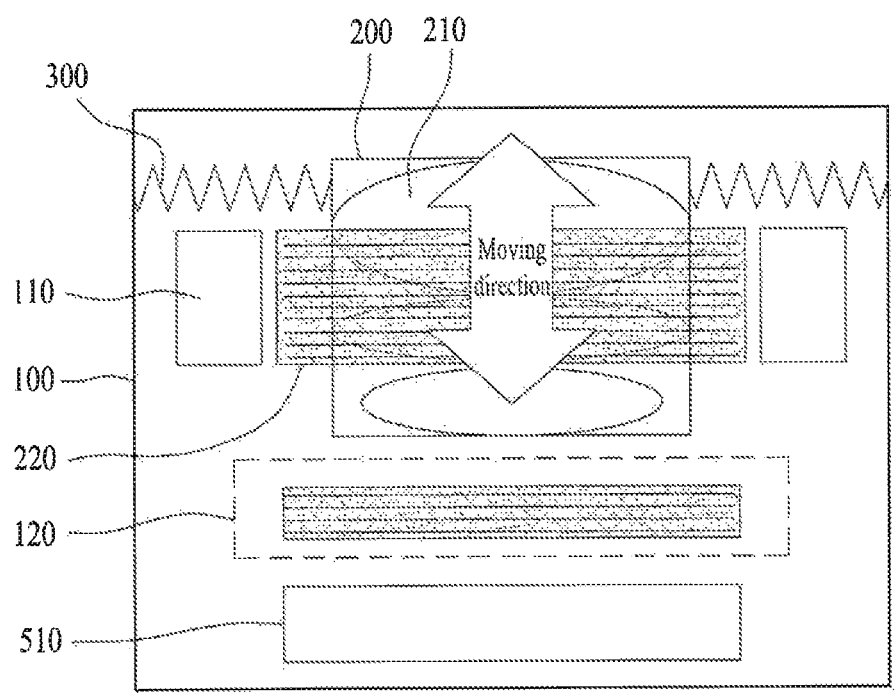
FIG. 1 and FIG. 2 are cross-sectional diagrams for configuration of a camera module according to one embodiment of the present invention.

Reference will now be made in detail to the preferred embodiments of the present invention, examples of which are illustrated in the accompanying drawings, to facilitate those having ordinary skill in the art to implement the invention. Wherever possible, the same reference numbers will be used throughout the drawings to refer to the same or like parts. Terminologies 'module' and 'unit' for components used in the following description are interchangeably usable in consideration of the facilitation for the specification writing but do not have distinctive meanings or roles. In describing embodiments disclosed in the present specification, if the details of the related art are determined as obscuring the gist of the embodiments disclosed in the present specification, the corresponding detailed description shall be omitted. The accompanying drawings are included to provide a further understanding of the invention, are incorporated in and constitute a part of this specification, and illustrate embodiments of the invention and together with the description serve to explain the principles of the invention. And, the accompanying drawings should be understood as including various modifications and variations of the invention that come within the scope of the appended claims and their equivalents.

Terminologies including ordinal numbers such as $1^{st}$, $2^{nd}$ and the like may be used to describe various components, by which the components may be non-limited. And, the terminologies are used for the purpose of discriminating one component from other components only.

If one component is mentioned as 'connected to' or 'accessing' another component, the former component may be connected to accesses the latter component in direct Yet, it is understood that a different component may be present in-between. On the other hand, if one component is mentioned as 'directly connected to' or 'directly accessing' another component, it is understood that a different component may is not present in-between.

Singular expression may include plural expressions unless having a clear meaning in the context.

In the present application, such a terminology as 'include', 'have' and the like intends to designate that a feature, a number, a step, an operation, a component, a part or a combination thereof disclosed in the specification exists and should be understood as not excluding possibility of existence or addition of at least one or more features, numbers, steps, operations, components, parts or combinations thereof.

A camera module described in the present specification may apply to a mobile phone, a smartphone, a laptop computer, a digital broadcast terminal, a PDA (personal digital assistants), a PMP (portable multimedia player), a navigation system, a slate PC, a tablet PC, an ultrabook, a wearable device (e.g., a smartwatch, a smart glass, an HMD (head mounted display)) and the like.

Yet, it is apparent to those skilled in the art that a configuration of a camera module according to an embodiment disclosed in this specification is applicable to such a fixed terminal as a digital TV, a desktop computer, a digital signage and the like except a case of being applicable to a mobile terminal only.

Figure 2:
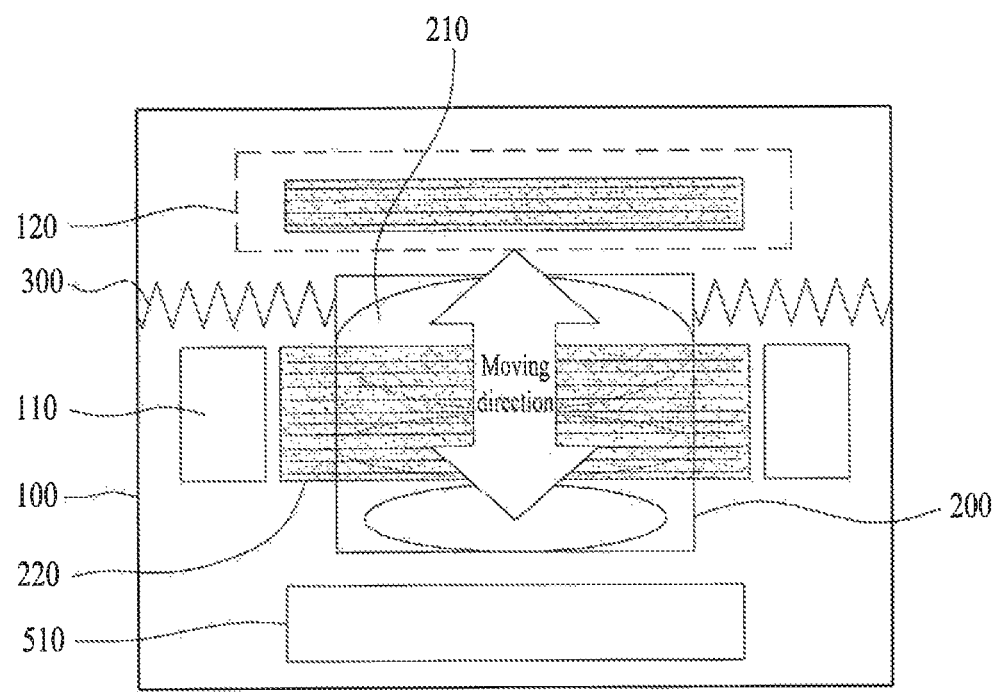

FIG. 1 and FIG. 2 are cross-sectional diagrams for configuration of a camera module according to one embodiment of the present invention.

Referring to FIG. 1 and FIG. 2, a camera module according to the present invention may include a fixed unit 100 having a magnet 110 and a fixed coil 120 disposed therein and a movable unit 200 having a lens 210 and a movable coil 220 disposed therein.

In this case, the fixed unit 100 may include a holder having a perforated hole formed in a central region.

And, the magnet 110 may be disposed on an inner lateral side of the perforated hole of the fixed unit 100.

For instance, there may be one magnet 110. In some cases, a multitude of magnets 110 may be provided.

In case of a multitude of the magnets 110 are provided, the magnets 110 may be disposed in a manner of being space apart from each other in equal intervals. In some cases, the magnets 110 may be disposed in different intervals.

A multitude of the magnets 110 may be disposed symmetric to an axis of coordinates, which passes through a center of the perforated hole of the fixed unit 110.

The reason for disposing a multitude of the magnets symmetric to the axis of the coordinates, which passes through the center of the perforated hole of the fixed unit 110, is to stably detect a displacement value of current or voltage according to the movement of the movable unit 200 (i.e., lens module) without external influence.

The movable unit 200 includes at least one lens 210 and is able to linearly move within the perforated hole of the fixed unit 100.

And, the movable unit 200 may be a lens module that includes the lenses 210.

The movable coil 220 is disposed to enclose an outer surface of the movable unit 220 so as to move together with the movable unit 200.

In this case, the movable coil 220 and the magnet 110 configure an actuator for moving the movable unit 200 and is able to drive the movable unit 200 to linearly move in top or bottom direction.

The fixed coil 120 is disposed in the fixed unit 100 and is able to receive current or voltage, which varies according to a distance from the movable coil 220, from the movable coil 220.

And, the fixed coil 120 is disposed by being spaced apart from one side of the movable unit 100 by a predetermined interval and can be located on a line of a moving direction of the movable unit 100.

Hence, the fixed coil 120 and the movable coil 220 can induce current or voltage to the fixed coil 120 from the movable coil 220 by electromagnetic induction.

In doing so, the induced current or voltage value may vary depending on a distance between the fixed coil 120 and the movable coil 220.

Namely, the current or voltage value induced to the fixed coil 120 varies depending on a vertical distance between the fixed coil 120 and the movable coil 220. Using such a displacement value, it is able to predict a position value of the lens module of the movable unit 200. Using the predicted position value of the lens module, it is able to find an optimal auto focus position value and is also able to control the movement of the movable unit 200 so as to move a real position value of the lens module to the optimal auto focus position value.

Moreover, the fixed coil 120 is located in a linear movement direction of the movable unit 200. The fixed coil 120 may be disposed under the movable unit 200 like FIG. 1 or over the movable unit 200 like FIG. 2.

In doing so, when the movable unit 200 makes a linear movement, the fixed coil 120 should be disposed in a manner that a minimum gap between the fixed coil 120 and the movable coil 220 should maintain a value equal to or greater than 0.

The reason for this is described as follows. If the minimum gap between the fixed coil 120 and the movable coil 220 is smaller than 0, the current or voltage received by the fixed coil 120 is switched to negative from positive, and vice versa. Hence, the displacement value of the current or voltage according to the distance may not be accurately detected.

If the gap between the fixed coil 120 and the movable coil 220 gets smaller, a variation rate of the current or voltage according to the distance is lowered. Hence, as the non-linearity of an induction signal received by the fixed coil 120 increases, the displacement value of the current or voltage according to the distance may not be accurately detected.

In particular, if the fixed coil 120 and the movable coil 220 overlap each other instrumentally, the linearity of the induction signal received by the fixed coil 120 is degraded and a sign of a code of the induction signal is inverted. Hence, an auto focus error may be generated.

The fixed coil 120 can be disposed along a circumference of a surface of at least one of a top side, bottom side and outer lateral side between the top side and the bottom side of the holder of the fixed unit 100.

In this case, a seat groove for fixing the fixed coil 120 is formed in the holder of the fixed unit 100. And, the fixed coil 120 can be disposed in the seat groove of the holder of the fixed unit 100.

Moreover, the winding number of the fixed coil 120 may be different from that of the movable coil 220.

For instance, the winding number of the fixed coil 120 may be smaller than that of the movable coil 220.

The reason why the winding number of the fixed coil 120 is smaller than that of the movable coil 220 is that an overall size of the camera module can be reduced and that a frequency signal for current or voltage induced to the fixed coil 120 can be amplified.

In some cases, the winding number of the fixed coil 120 may be equal to that of the movable coil 220.

The movable coil 220 receives a drive signal having a high frequency signal carried on a low frequency signal and is then able to transmit the drive signal to the fixed coil 120.

In particular, the drive signal applied to the movable coil 220 of the movable unit 200 may include a signal generated from synthesizing a drive signal of a low frequency with a random high frequency signal.

Hence, when the fixed coil 120 receives a frequency signal for current or voltage induced from the movable coil 220 by electromagnetic induction, the received frequency single may include a signal generated from synthesizing a low frequency signal with a high frequency signal.

In this case, the reason why the drive signal having the low frequency signal synthesized with the high frequency signal is applied to the movable coil 220 is that a displacement value of current or voltage can be easily detected by increasing a frequency signal for the current or voltage induced to the fixed coil 120 according to the electromagnetic induction.

In particular, the low frequency signal of the drive signal is a signal component for moving the movable unit 200. The high frequency signal synthesized in the drive signal is a signal component for sensing a moving position of the movable unit 200 and may include a frequency signal higher than the drive signal.

For instance, the high frequency signal synthesized in the drive signal may have about 100 kHz~5 MHz, by which the present invention is non-limited.

Hence, a focus position calculating unit of the camera module detects a high frequency signal included in a drive signal and is then able to calculate a focus position value of the movable unit 200 based on the detected high frequency signal.

The movable coil 220 receives an input of drive current or voltage by being electrically connected to a wiring 300, and the fixed coil 120 can output current or voltage received from the movable coil 220 by being electrically connected to the wiring 300.

In this case, the wiring 300 may include a spring configured to provide an elastic force according to a movement of the movable unit 200 by being connected between the fixed unit 100 and the movable unit 200.

For instance, the movable coil 220 receives an input of a drive current or voltage by being electrically connected to a first wiring and a second wiring. And, the fixed coil 120 can output current or voltage received from the movable coil 220 by being electrically connected to a third wiring and a fourth wiring.

In this case, the first wiring is electrically connected to a positive terminal of a power supply unit that provides current or voltage to the movable coil, and the second wiring can be electrically connected to a negative terminal of the power supply unit.

The third wiring is electrically connected to a positive terminal of an auto focus control unit, and the fourth wiring can be electrically connected to a negative terminal of the auto focus control unit.

In this case, the auto focus control unit calculates a focus position value based on a displacement value of the current or voltage received from the fixed coil 120 and is able to control a movement of the movable unit 200 according to the calculated focus position value.

And, a damper (not shown in the drawing) may be disposed between the wiring 300 and the fixed unit 100.

In particular, the damper may be disposed adjacent to a connecting end of the wiring 300 and the fixed unit 100.

The reason why the damper is provided is to suppress the natural oscillation of the wiring 300 that is the spring. Hence, by reducing the hysteresis properties, it is able to prevent the error of the auto focus.

Moreover, the camera module according to the present invention can further include the auto focus control unit. In particular, the auto focus control unit (not shown in the drawing) may include a focus position calculating unit configured to calculate a focus position value based on the displacement value of the current or voltage received from the fixed coil 12 and a drive control unit configured to control a movement of the movable unit 200 by applying a drive signal to the movable unit 200 according to the calculated focus position value.

In this case, the focus position calculating unit may include a detecting unit configured to detect a displacement value of current or voltage from the fixed coil 120 and a calculating unit configured to calculate a focus position value of the movable unit 200 based on the current or voltage displacement value detected by the detecting unit.

For instance, the detecting unit may include a half-wave rectifying unit configured to rectify a frequency signal for current or voltage received from the fixed coil 120 into a half-wave signal, a converting unit configured to convert the half-wave signal received from the half-wave rectifying unit into current or voltage, an amplifying unit configured to amplify a frequency signal for the current or voltage converted by the converting unit, and a peak detecting unit configured to detect a peak of the frequency signal amplified by the amplifying unit.

And, the auto focus control unit may further include an image sensor configured to sense an image incident through a lens of the movable unit 200 and an image signal processing unit configured to process the image sensed by the image sensor.

In this case, the focus position calculating unit can calculate a focus position value based on the image signal processed by the image processing unit and the displacement value of the current or voltage received from the fixed coil 120.

Besides, the auto focus control unit may further include a distance sensor configured to sense a distance from a subject to be photographed.

In this case, the focus position calculating unit can calculate a focus position value based on the distance from the subject, which is sensed by the distance sensor.

Besides, the auto focus control unit may further include a distance sensor configured to sense a distance from a subject to be photographed, an image sensor configured to sense an image incident through the lens of the movable unit, and an image signal processing unit configured to process an image signal sensed by the image sensor.

In this case, the focus position calculating unit may calculate a focus position value based on the image signal processed by the image signal processing unit and the displacement value of the current or voltage received from the fixed coil 120 or based on the distance from the subject sensed by the distance sensor.

Besides, the auto focus control unit may further include an illumination sensor configured to sense external brightness.

In this case, if the external brightness sensed by the illumination sensor is equal to or greater than a reference value, the focus position calculating unit calculates a focus position value based on the image signal processed by the image signal processing unit and the displacement value of the current or voltage received from the fixed coil 120. If the external brightness sensed by the illumination sensor is smaller the reference value, the focus position calculating unit calculates a focus position value based on the distance from the subject sensed by the distance sensor.

Moreover, if the external brightness sensed by the illumination sensor is smaller than the reference value, the focus position calculating unit can provide a notification message, which notifies that a contrast focus scheme of calculating a focus position using an image contrast of a subject is switched to a laser focus scheme of calculating a focus position using a distance from a subject, to a display screen.

Moreover, if receiving a reference value setting request signal for external brightness, the focus position calculating unit provides a reference value setting window to the display screen. If a reference value setting complete signal for the external brightness is received through the reference value setting window, the focus position calculating unit may change the reference value for the external brightness according to a setting completed setup value.

Moreover, if receiving an auto focus setting request signal, the focus position calculating unit provides an auto focus setting window to the display screen. If receiving an auto focus setting complete signal through the auto focus setting window, the focus position calculating unit can calculate a focus position value according to a setting-completed auto focus scheme.

In this case, the auto focus setting window may include a contrast focus item for calculating a focus position using an image contrast of a subject, a laser focus item for calculating a focus position using a distance from a subject, and a hybrid focus item for calculating a focus position by one of a contrast focus item for calculating a focus position using an image contrast of a subject and a laser focus item for calculating a focus position using a distance from a subject according to external brightness.

Thus, the camera module according to the present invention can find an auto focus position quickly and accurately in a manner of disposing a fixed coil to a fixed unit, disposing a movable coil to a moving unit, and then detecting a displacement value of current or voltage according to a distance between the fixed coil and the movable coil.

The present invention can simplify an electrical connection between a coil including a fixed coil and a movable coil and a circuit board using a spring connected between a fixed unit and a movable unit.

The present invention can downsize a camera module in a manner of reducing overall thickness of the camera module by disposing a fixed coil within a holder groove of a fixed unit or by disposing a fixed coil within a circuit board.

The present invention maintains a minimum interval between a movable coil and a fixed coil, thereby preventing a reduction of a displacement value of current or voltage according to a distance and finding an accurate auto focus position.

The present invention performs auto focus by one of a contrast focus scheme, a laser focus scheme and a hybrid focus scheme according to a user request or external brightness, thereby providing a user with convenience.

And, the present invention reduces natural oscillation of a spring by disposing a damper between the spring and a fixed unit, thereby preventing error of auto focus and reducing auto focus time.

Figure 3:
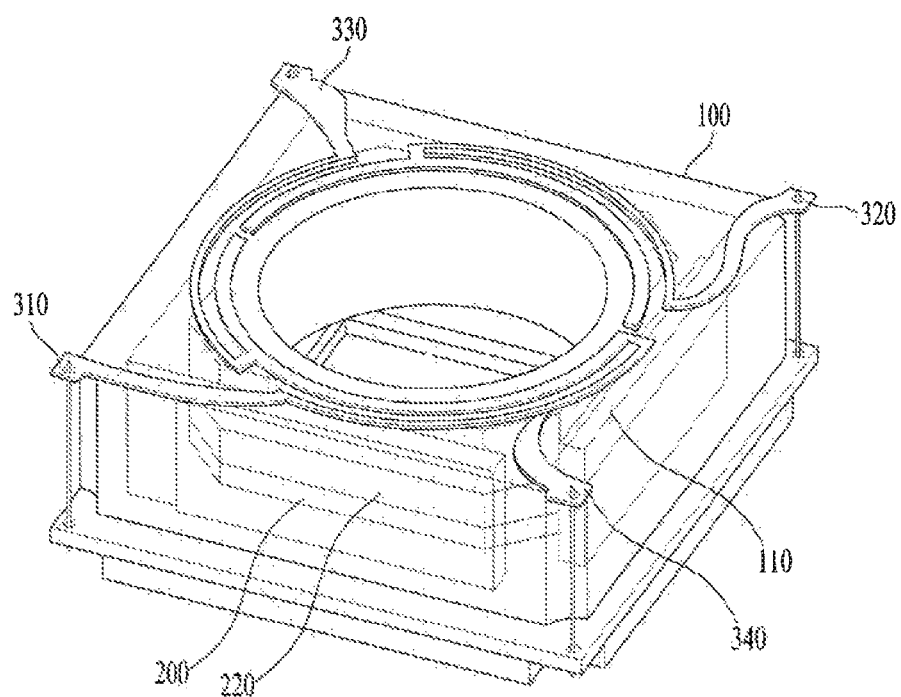
FIGS. 3 to 5 are electrical schematic diagrams of a movable coil and a fixed coil.
Figure 4:
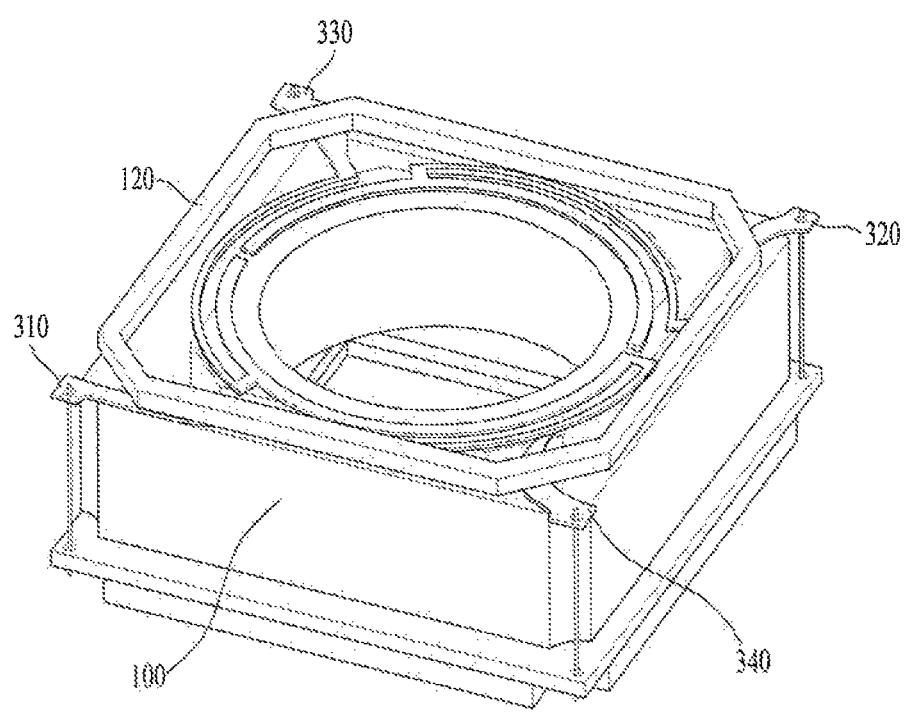
Figure 5:
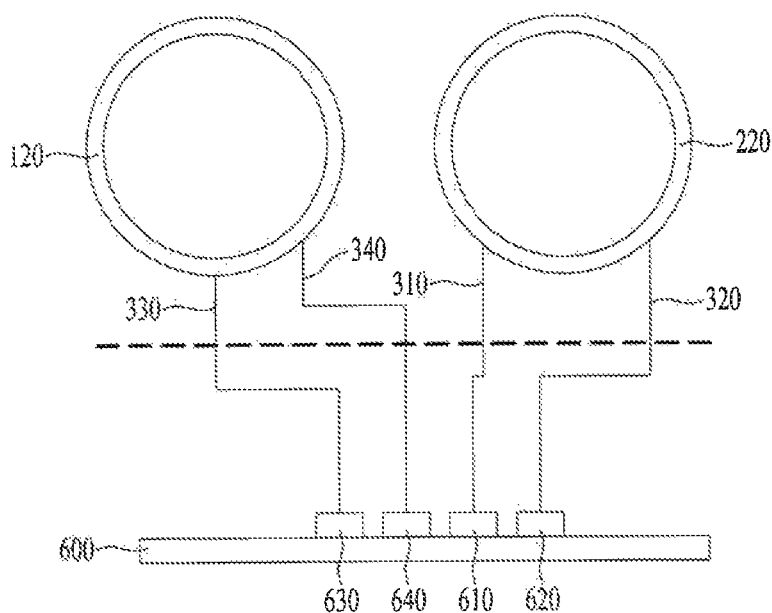

FIGS. 3 to 5 are electrical schematic diagrams of a movable coil and a fixed coil.

Referring to FIGS. 3 to 5, a movable coil 220 is disposed to enclose an outer surface of a movable unit 200. A fixed coil 120 is disposed in a fixed unit 100, thereby receiving current or voltage varying according to a distance from the movable coil 220 from the movable coil 220.

The movable coil 220 receives an input of a drive current or voltage by being electrically connected to a first wiring 310 and a second wiring 320. The fixed coil 120 can output current or voltage received from the movable coil 220 by being electrically connected to a third wiring 330 and a fourth wiring 340.

For instance, the first to $4^{th}$ wirings 310, 320, 330 and 340 play a role as a spring for providing an elastic force according to a movement of the movable unit 200 by being connected between the fixed unit 100 and the movable unit 200 and simultaneously plays a role as an electrical wiring connected electrically to a terminal of a circuit board 600.

In this case, the first wiring 310 is electrically connected to one end of the movable coil 220 and a positive terminal 610 of a power supply unit that provides current or voltage to the movable coil 220, and the second wiring 320 can be electrically connected to the other end of the movable coil 220 and a negative terminal 620 of the power supply unit.

The third wiring 330 is electrically connected to one end of the fixed coil 120 and a positive terminal 630 of the auto focus control unit, and the fourth wiring 340 can be electrically connected to the other end of the fixed coil 120 and a negative terminal of the auto focus control unit.

Thus, using the springs connected between the fixed unit 100 and the movable unit 200 as electrical wirings of the fixed coil and the movable coil, the present invention minimized electrical wirings and simplifies an electrical design, thereby enhancing productivity and reliability of products.

Figure 6:
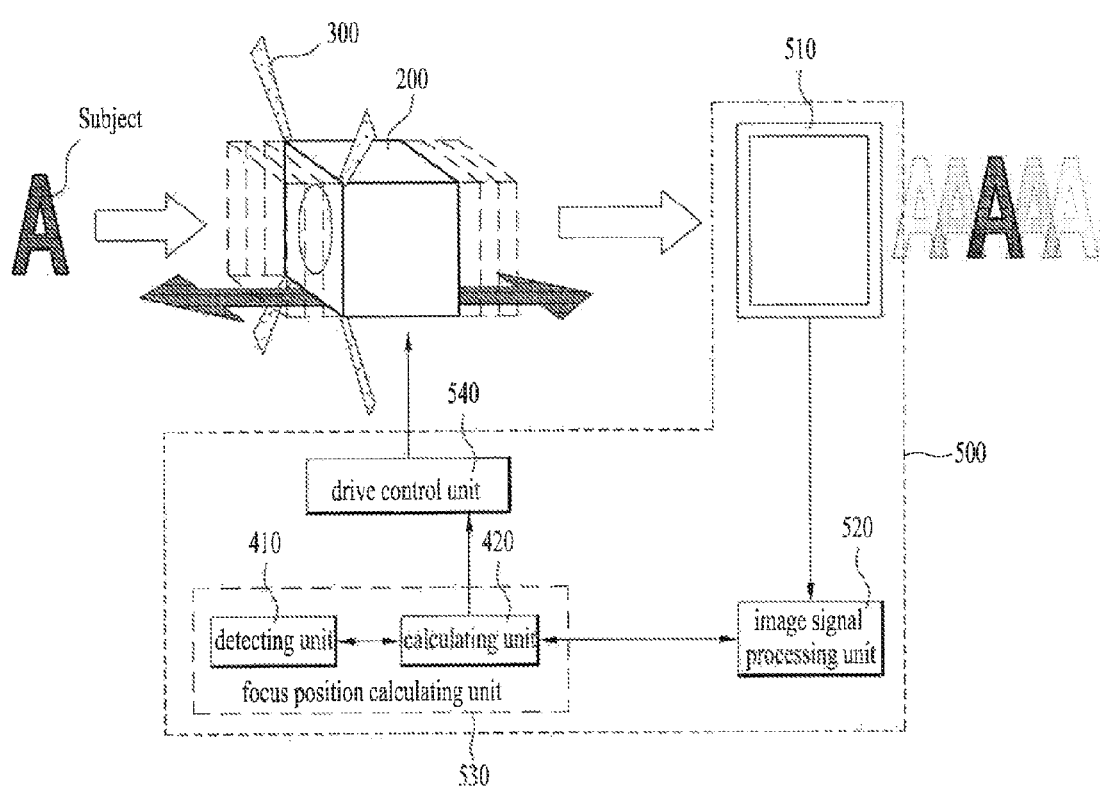
FIG. 6 is a block diagram of an auto focus control unit of a camera module according to a first embodiment of the present invention.

FIG. 6 is a block diagram of an auto focus control unit of a camera module according to a first embodiment of the present invention.

Referring to FIG. 6, a camera module according to the present invention may include an auto focus control unit 500 configured to control auto focusing of a movable unit 200 that is a lens module.

The auto focus control unit 500 may include an image sensor 510, an image signal processing unit 520, a focus position calculating unit 530, and a drive control unit 540.

The image sensor 510 senses an image of a subject incident through a lens of the movable unit 200 moved by auto focusing in a manner of being connected to a fixed unit through a wiring 300 that is a spring.

The image signal processing unit 520 processes an image signal sensed by the image sensor 510.

The focus position calculating unit 530 can calculate a focus position value based on the image signal processed by the image signal processing unit 520 and a displacement value of the current or voltage received from a fixed coil.

In particular, the focus position calculating unit 530 may include a detecting unit 410 configured to detect a displacement value of current or voltage from the fixed coil and a calculating unit 420 configured to calculate a focus position value of the movable unit 200 based on the image signal processed by the image signal processing unit 520 and the displacement value of the current or voltage detected by the detecting unit 410.

In more particular, the calculating unit 420 extracts an image of highest contrast by comparing contrasts of signal-processed images and is then able to determine a position of the movable unit 200, at which the extracted image was captured, as an optimal focus position.

And, the drive control unit 540 can control the movable unit 200 to move to the calculated focus position value.

Thus, the auto focus scheme of the present invention may include a contrast focus scheme of calculating a focus position using an image contrast of a subject.

Figure 7:
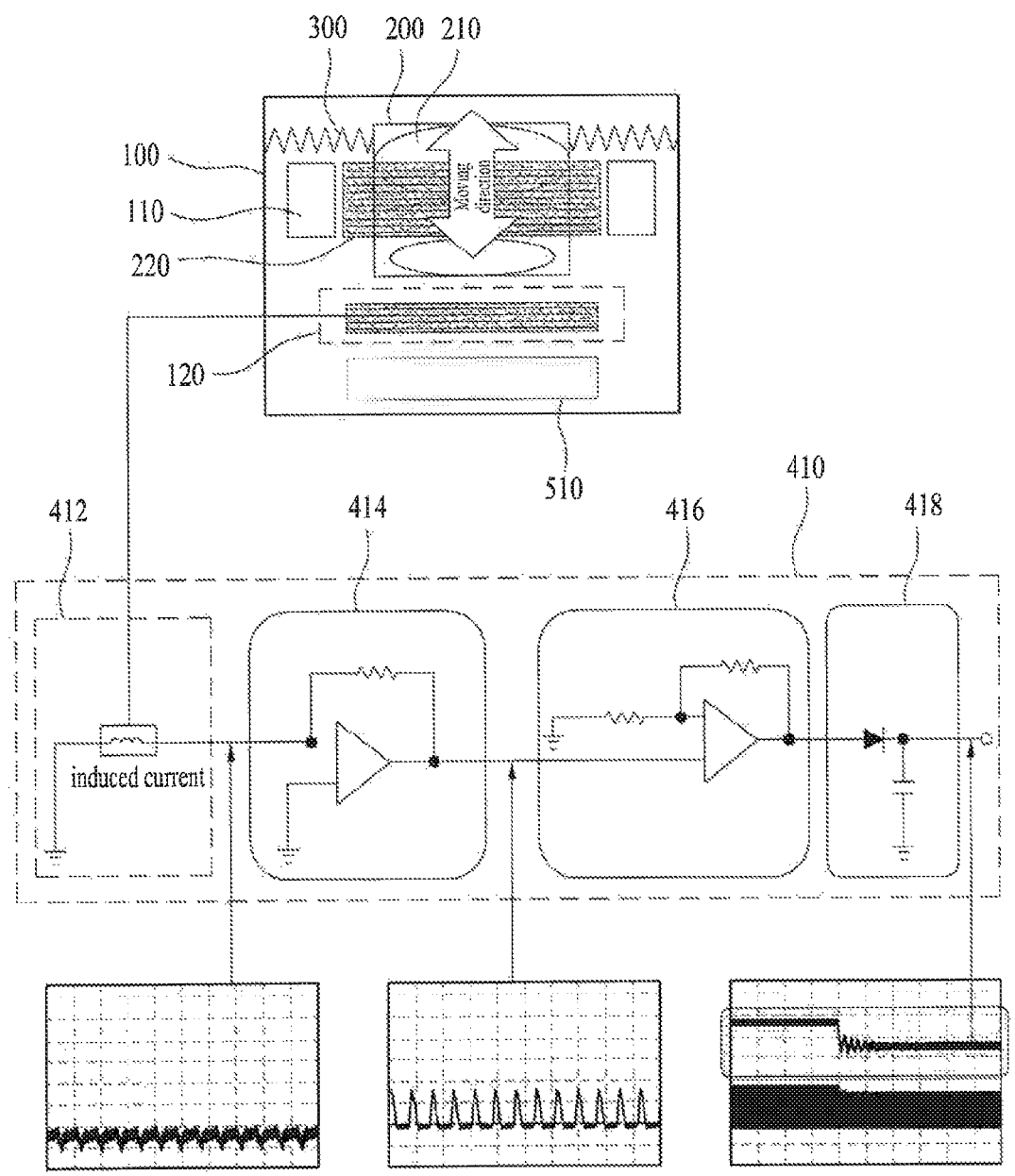
FIG. 7 is a circuit diagram of a detecting unit shown in FIG. 6.

FIG. 7 is a circuit diagram of a detecting unit shown in FIG. 6.

Referring to FIG. 7, the camera module according to the present invention configures a magnetic circuit in a manner of disposing a permanent magnet 110 and the movable coil 220 to the fixed unit 100 and the movable unit 200, respectively. Hence, the movable unit 200 (i.e., lens module) is driven by Lorenz Force of current flowing through a coil.

The fixed coil 120 is disposed to the fixed unit 100 and is able to receive current or voltage varying according to a distance from the movable coil 220 from the movable coil 220.

And, the fixed coil 120 is disposed by being spaced apart from one side of the movable unit 100 by a predetermined gap and can be located on a line of a moving direction of the movable unit 100.

Hence, the fixed coil 120 and the movable coil 220 can induce current or voltage to the fixed coil 120 from the movable coil 220 by electromagnetic induction.

In doing so, the induced current or voltage value may vary depending on a distance between the fixed coil 120 and the movable coil 220.

Namely, the current or voltage value induced to the fixed coil 120 varies depending on a vertical distance between the fixed coil 120 and the movable coil 220. Using such a displacement value, it is able to predict a position value of the lens module of the movable unit 200.

Hence, the detecting unit 410 can detect a displacement value of the current or voltage received from the fixed coil 120.

In this case, the detecting unit 410 may include a half-wave rectifying unit 412, a converting unit 414, an amplifying unit 416, and a peak detecting unit 418, by which the present invention is non-limited.

First of all, the half-wave rectifying unit 412 of the detecting unit 410 rectifies a frequency signal for current or voltage received from the fixed coil 120 into a half-wave signal.

The converting unit 414 of the detecting unit 410 converts the half-wave signal received from the half-wave rectifying unit 412 into current or voltage.

The amplifying unit 416 of the detecting unit 410 amplifies a frequency signal for the current or voltage converted by the converting unit 414.

And, the peak detecting unit 418 of the detecting unit 410 detects a peak of the frequency signal amplified by the amplifying unit 416.

For instance, if current is induced to the fixed coil 120, the half-wave rectifying unit 412 rectifies a frequency signal for the induced current into a half-wave signal.

The converting unit 414 is a current-voltage conversion circuit for converting current into voltage and converts the current, which is rectified into the half-wave signal, into voltage.

The amplifying unit 416 amplifies the converted voltage.

Subsequently, the peak detecting unit 418 detects a peak value of the amplified voltage and is able to output the detected peak value.

Thus, the detecting unit 410 detects a displacement value of the current or voltage received from the fixed coil 120. Using the displacement value, the auto focus control unit for controlling the auto focusing of the movable unit 200 (i.e., lens module) is able to predict a position value of the lens module of the movable unit 200.

Finally, the auto focus control unit finds an optimal auto focus position value using the predicted position value of the lens module and is able to control the movement of the movable unit 200 so that a real position value of the lens module can move to the optimal focus position value.

Figure 8:
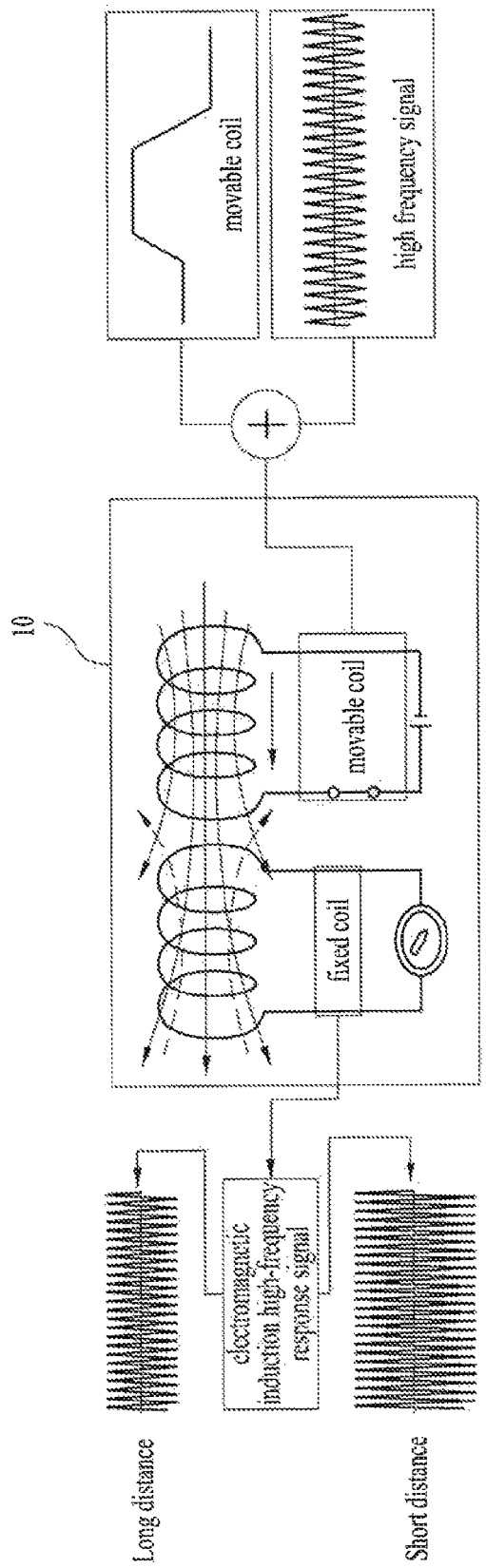
FIG. 8 is a diagram to describe electromagnetic induction between a fixed coil and a movable coil shown in FIG. 1.

FIG. 8 is a diagram to describe electromagnetic induction between the fixed coil and the movable coil shown in FIG. 1.

Referring to FIG. 8, a movable coil of a camera module 10 receives a drive signal having a high frequency signal carried on a low frequency signal and then transmits the drive signal to a fixed coil.

Namely, the drive signal applied to the movable coil of the movable unit may include a signal having a random high frequency signal carried on the drive signal of low frequency.

Hence, when the fixed coil receives a frequency signal for current or voltage induced from the movable coil by electromagnetic induction, the received frequency single may include a signal having a high frequency signal carrier on a low frequency signal.

In this case, an electromagnetically-induced high frequency response signal decreases if a distance between the fixed coil and the movable coil increases. The electromagnetically-induced high frequency response signal increases if a distance between the fixed coil and the movable coil decreases.

Thus, since the electromagnetically-induced high frequency response signal varies depending on the distance between the fixed coil and the movable coil, the detecting unit detects a displacement value of the current or voltage received by the fixed coil and the auto focus control unit can predict a position value of the lens module of the movable unit 200 using this displacement value.

And, the auto focus control unit finds an optimal auto focus position value using the predicted position value of the lens module and is able to control the movement of the movable unit so that a real position value of the lens module can move to the optimal focus position value.

Moreover, when a drive signal is applied to the movable coil of the movable unit, the auto focus control unit can synthesize a drive signal of a low frequency signal with a random high frequency signal.

In this case, the low frequency signal of the drive signal is a signal component for moving the movable unit. The high frequency signal synthesized in the drive signal is a signal component for sensing a moving position of the movable unit and may include a frequency signal higher than the drive signal.

For instance, the high frequency signal synthesized in the drive signal may have about 100 kHz 5 MHz, by which the present invention is non-limited.

And, the auto focus control unit detects a high frequency signal from the signal received by the fixed coil through the detecting unit and is able to calculate a focus position value of the movable unit based on the detected high frequency signal through the calculating unit.

Thus, the reason why the drive signal having the low frequency signal synthesized with the high frequency signal is applied to the movable coil is that a displacement value of current or voltage can be easily detected by increasing a frequency signal for the current or voltage induced to the fixed coil according to the electromagnetic induction.

Figure 9:
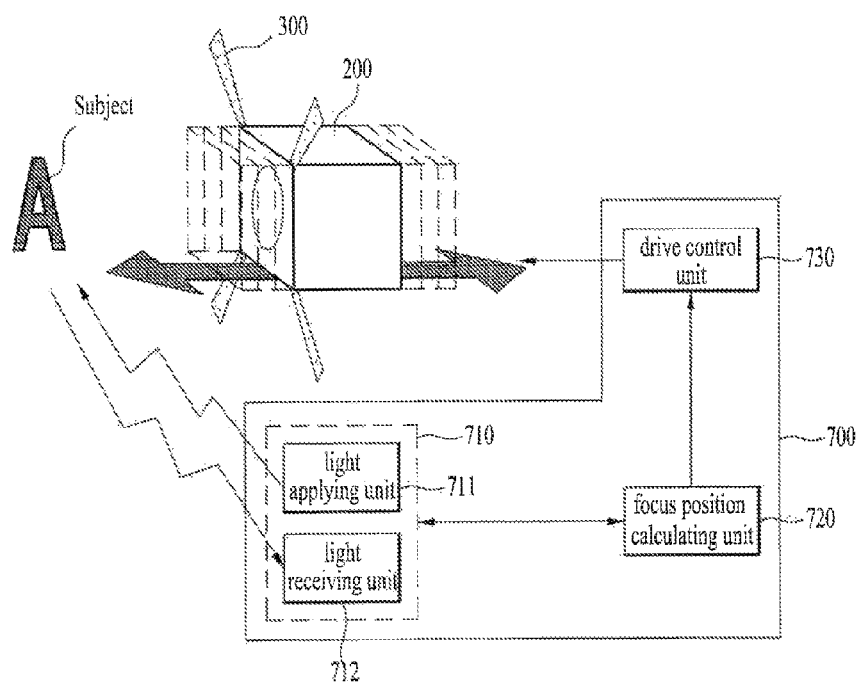
FIG. 9 is a block diagram of an auto focus control unit of a camera module according to a second embodiment of the present invention.

FIG. 9 is a block diagram of an auto focus control unit of a camera module according to a second embodiment of the present invention.

Referring to FIG. 9, a camera module according to the present invention may include an auto focus control unit 700 configured to control auto focusing of a movable unit 200 that is a lens module.

The auto focus control unit 700 may include a distance sensor 710, a focus position calculating unit 720 and a drive control unit 730.

The distance sensor 710 may sense a distance from a subject to be photographed.

For instance, the distance sensor 710 may include a light applying unit 711 configured to applying light to a subject and a light receiving unit 712 configured to receive light reflected by the subject.

In this case, the light applying unit 71a may include at least one laser diode or vertical cavity surface emitting laser (VCSEL) source.

In some cases, the light applying unit 711 may include an infrared light source.

The focus position calculating unit 720 can calculate a focus position value based on a distance from a subject sensed by the distance sensor 710.

In particular, if the distance sensor 710 senses the distance from the subject, the focus position calculating unit 720 can calculate a focus position value according to a distance by referring to a data table previously saved in a memory.

Subsequently, the drive control unit 540 can control the movable unit 200 to move to the calculated focus position value.

Figure 10:
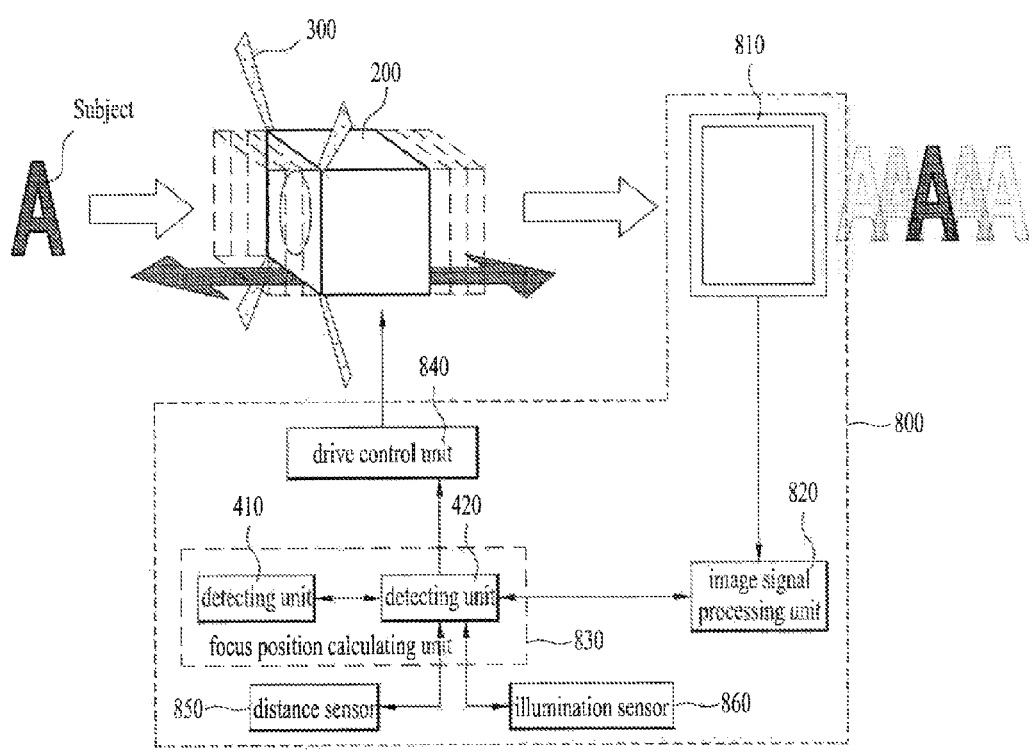
FIG. 10 is a block diagram of an auto focus control unit of a camera module according to a third embodiment of the present invention.

Thus, the auto focus scheme of the present invention may include a laser focus scheme of calculating a focus position using a distance from a subject FIG. 10 is a block diagram of an auto focus control unit of a camera module according to a third embodiment of the present invention.

Referring to FIG. 10, a camera module according to the present invention may include an auto focus control unit 800 configured to control auto focusing of a movable unit 200 that is a lens module.

The auto focus control unit 800 may include an image sensor 810, an image signal processing unit 820, a focus position calculating unit 830, a drive control unit 840, a distance sensor 850 and an illumination sensor.

In this case, the image sensor 810 senses an image of a subject incident through a lens of the movable unit 200 moved by auto focusing in a manner of being connected to a fixed unit through a wiring 300 that is a spring.

The image signal processing unit 820 processes an image signal sensed by the image sensor 810.

Subsequently, the distance sensor 850 can sense a distance from a subject to be photographed.

The focus position calculating unit 830 can calculate a focus position value based on the image signal processed by the image signal processing unit 820 and a displacement value of the current or voltage received from a fixed coil or based on the distance from the subject sensed by the distance sensor 850.

In particular, the focus position calculating unit 530 may include a detecting unit 410 and a calculating unit 420.

If an auto focus scheme of the present invention is set to a contrast focus scheme of calculating a focus position using an image contrast of a subject, the calculating unit 420 can calculate a focus position value of the movable unit 200 based on the image signal processed by the image signal processing unit 820 and a displacement value of the current or voltage detected by the detecting unit 410.

In doing so, the calculating unit 420 extracts an image of highest contrast by comparing contrasts of signal-processed images and is then able to determine a position of the movable unit 200, at which the extracted image was captured, as an optimal focus position.

If an auto focus scheme of the present invention is set to a laser focus scheme of calculating a focus position using a distance from a subject, the calculating unit 420 can calculate a focus position value of the movable unit 200 based on the distance from the subject sensed by the distance sensor 850.

In particular, if the distance sensor 810 senses the distance from the subject, the calculating unit 420 can calculate a focus position value according to a distance by referring to a data table previously saved in a memory.

Subsequently, the drive control unit 840 can control the movable unit 200 to move to the calculated focus position value.

Meanwhile, the illumination sensor 860 can sense external brightness.

If the external brightness sensed by the illumination sensor 860 is equal to or greater than a reference value, the focus position calculating unit 830 can calculate a focus position value based on the image signal processed by the image signal processing unit 820 and the displacement value of the current or voltage received from the fixed coil.

If the external brightness sensed by the illumination sensor 860 is smaller the reference value, the focus position calculating unit 830 can calculate a focus position value based on the distance from the subject sensed by the distance sensor.

For instance, the reference value for the external brightness may include about 100 lux, by which the present invention is non-limited.

In some cases, if the external brightness sensed by the illumination sensor 860 is smaller than the reference value, the focus position calculating unit 830 can provide a notification message, which notifies that a contrast focus scheme of calculating a focus position using an image contrast of a subject is switched to a laser focus scheme of calculating a focus position using a distance from a subject, to a display screen.

Moreover, if receiving a reference value setting request signal for external brightness, the focus position calculating unit 830 can provide a reference value setting window to the display screen.

If a reference value setting complete signal for the external brightness is received through the reference value setting window, the focus position calculating unit 830 may change the reference value for the external brightness according to a setting completed setup value.

In this case, the reason why the reference value setting window is provided is to provide a user with convenience in directly setting a timing of switching a contrast focus scheme to a laser focus scheme.

Moreover, if receiving an auto focus setting request signal, the focus position calculating unit 830 provides an auto focus setting window to the display screen.

If receiving an auto focus setting complete signal through the auto focus setting window, the focus position calculating unit 830 can calculate a focus position value according to a setting-completed auto focus scheme.

In this case, the auto focus setting window may include a contrast focus item for calculating a focus position using an image contrast of a subject, a laser focus item for calculating a focus position using a distance from a subject, and a hybrid focus item for calculating a focus position by one of a contrast focus item for calculating a focus position using an image contrast of a subject and a laser focus item for calculating a focus position using a distance from a subject according to external brightness.

Thus, the auto focus scheme of the present invention may include the hybrid focus item for calculating a focus position by one of a contrast focus item for calculating a focus position using an image contrast of a subject and a laser focus item for calculating a focus position using a distance from a subject according to external brightness.

Namely, the present invention takes an image by the contrast focus scheme if the external brightness corresponds to a bright environment. The present invention takes an image by the laser focus scheme if the external brightness corresponds to a dark environment. Therefore, the present invention can optimize performance of the camera module.

Figure 11:
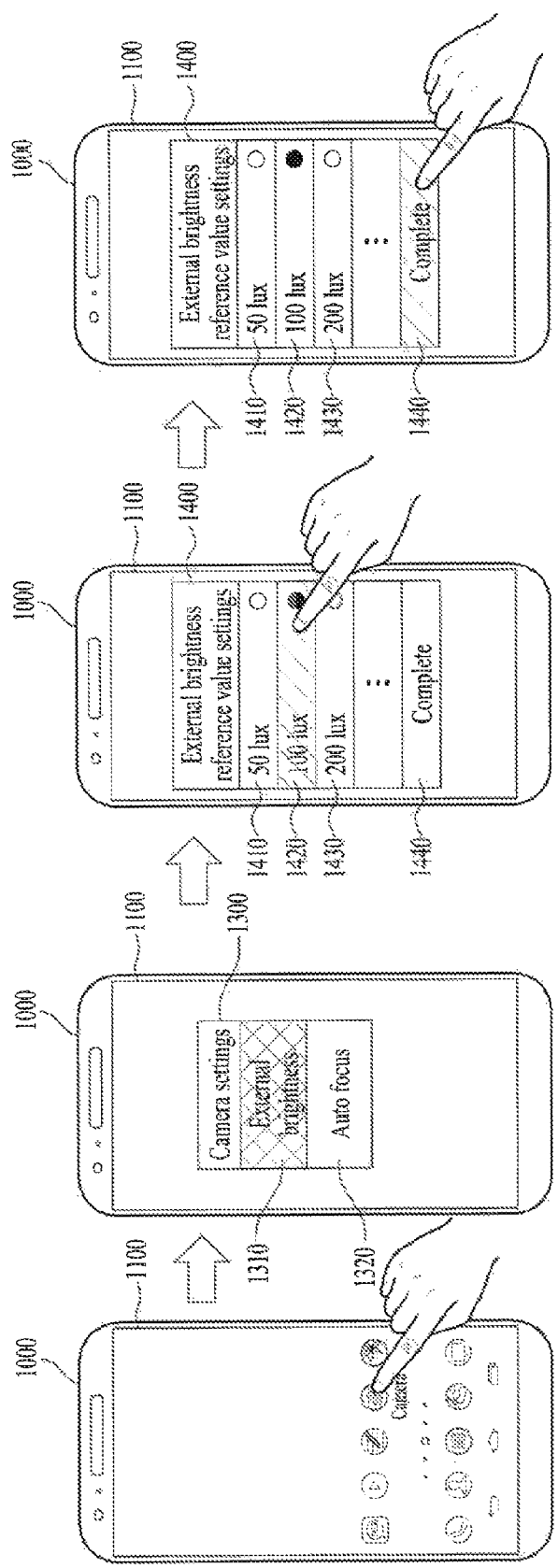
FIG. 11 is a diagram to describe a method of setting a reference value for external brightness.

FIG. 11 is a diagram to describe a method of setting a reference value for external brightness.

Referring to FIG. 11, if a user selects a camera setting icon 1200 provided onto a display screen 1100 of a mobile terminal 1000, an auto focus control unit of a camera module can provide a camera setting window 1300 onto the display screen 1100.

In this case, the camera setting window 1300 may include an external brightness setting item 1310 and an auto focus setting item 1320.

Subsequently, if the user selects the external brightness setting item 1310, the auto focus control unit of the camera module can provide a reference value setting window 1400 for the external brightness onto the display screen 110.

In this case, the reference value setting window 1400 for the external brightness may include such numerical values of the external brightness as 50-lux item 1410, 100-lux item 1420, 200-lux item 1430 and the like and a selection complete item 1440.

After the user has selected the 100-lux item, if the user selects the selection complete item 1440, the auto focus control unit of the camera module can change the reference value for the external brightness according to a setting-completed setup value.

Thus, if a reference value setting request signal for external brightness is received, the present invention can provide the reference value setting window 1400 to the display screen 1100.

If a reference value setting complete signal for external brightness is received through the reference value setting window 1400, the present invention can change a reference value for the external brightness according to a setting-completed setup value.

In this case, the reason why the reference setting window is provided is to provide user convenience in enabling a user to directly set up a timing point of switching a contrast focus scheme to a laser focus scheme.

Figure 12:
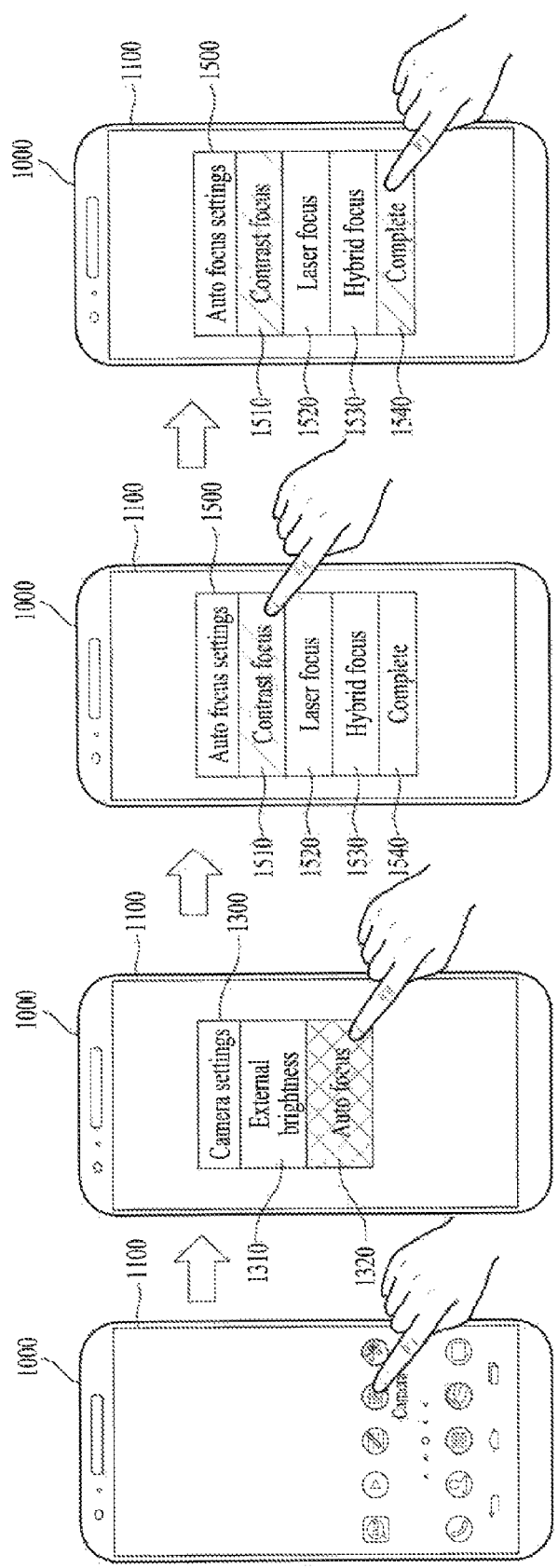
FIG. 12 is a diagram to describe an auto focus setting method.

FIG. 12 is a diagram to describe an auto focus setting method.

Referring to FIG. 12, if a user selects a camera setting icon 1200 provided onto a display screen 1100 of a mobile terminal 1000, an auto focus control unit of a camera module can provide a camera setting window 1300 onto the display screen 1100.

In this case, the camera setting window 1300 may include an external brightness setting item 1310 and an auto focus setting item 1320.

Subsequently, if the user selects the auto focus setting item 1320, the auto focus control unit of the camera module can provide an auto focus setting window 1500 onto the display screen 1100.

In this case, the auto focus setting window 1500 may include a contrast focus item 1510, a laser focus item 1520 and a hybrid focus item 1530, and may further include a selection complete item 1540.

The contrast focus item 1510 corresponds to a focus scheme of calculating a focus position using an image contrast of a subject, and the laser focus item 1520 corresponds to a focus scheme of calculating a focus position using a distance from a subject.

The hybrid focus item 1530 corresponds to a scheme of calculating a focus position by one of the contrast focus scheme of calculating a focus position using an image contrast of a subject and the laser focus scheme of calculating a focus position using a distance from a subject according to external brightness.

After the user has selected the contrast focus item 1510, if the user selects the selection complete item 1540, the auto focus control unit of the camera module can calculate a focus position value by the setting-completed contrast focus scheme.

Thus, if receiving an auto focus setting request signal, the present invention provides an auto focus setting window to a display screen. If receiving an auto focus setting complete signal through the auto focus setting window, the present invention can calculate a focus position value according to the setting-completed auto focus scheme.

Figure 13:
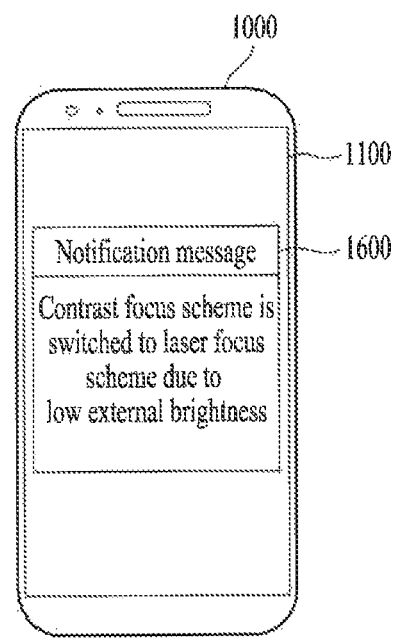
FIG. 13 is a diagram of a switch notification message of an auto focus scheme.

FIG. 13 is a diagram of a switch notification message of an auto focus scheme.

Referring to FIG. 13, if external brightness sensed by an illumination sensor is equal to or greater than a reference value, an auto focus control unit of a camera module can calculate a focus position value based on an image signal processed by an image signal processing unit and a displacement value of the current or voltage received from a fixed coil.

If the external brightness sensed by the illumination sensor is smaller the reference value, the auto focus control unit can calculate a focus position value based on a distance from a subject sensed by a distance sensor.

In this case, if the external brightness sensed by the illumination sensor is smaller than the reference value, the auto focus control unit can provide a notification message, which notifies that a contrast focus scheme of calculating a focus position using an image contrast of a subject is switched to a laser focus scheme of calculating a focus position using a distance from a subject, to a display screen 1100 of a mobile terminal 1100.

In this case, the reason for providing the notification message is described as follows. First of all, as a user recognizes a focus type for a currently taken image through the notification message, the user can compare qualities of images taken by various focus types. Hence, the present invention provides the user with user convenience in taking an image by a focus scheme preferred by the user.

FIGS. 14 to 17 are diagrams to show a location of a fixed coil disposed in a camera module.

Referring to FIGS. 14 to 17, a fixed unit 200 may include a holder having a perforated hole formed in a center region.

In this case, a fixed coil 120 may be formed along a circumference of a surface of at least one of a top side of the holder, a bottom side of the holder and an outer lateral side between the top side and the bottom side.

Figure 14:
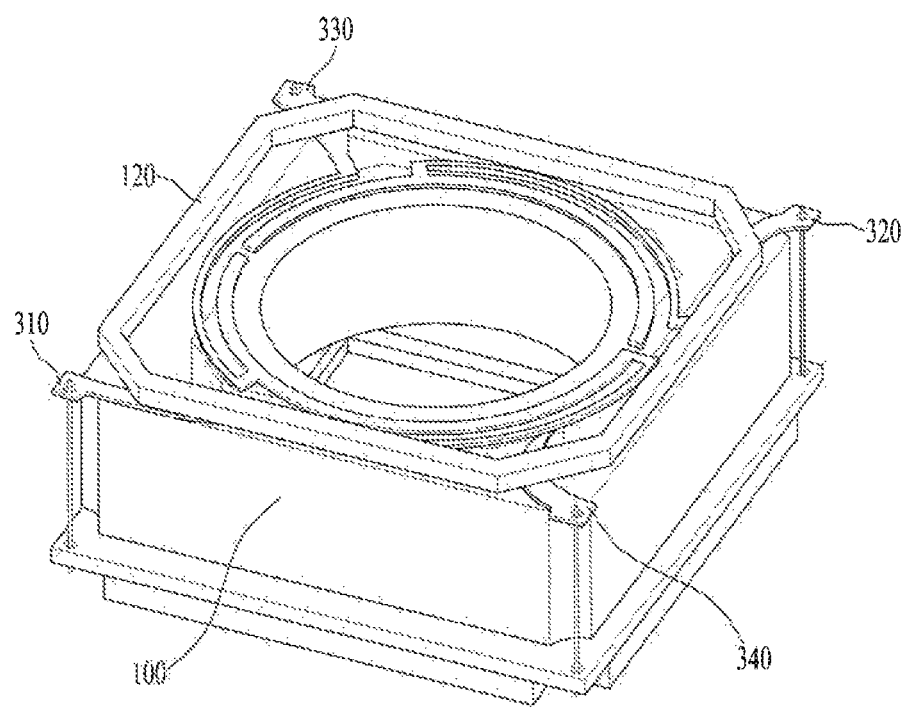
FIGS. 14 to 17 are diagrams to show a location of a fixed coil disposed in a camera module.

The fixed coil 120, as shown in FIG. 14, may be formed along a circumference of an edge of the top side of the holder.

Figure 15:
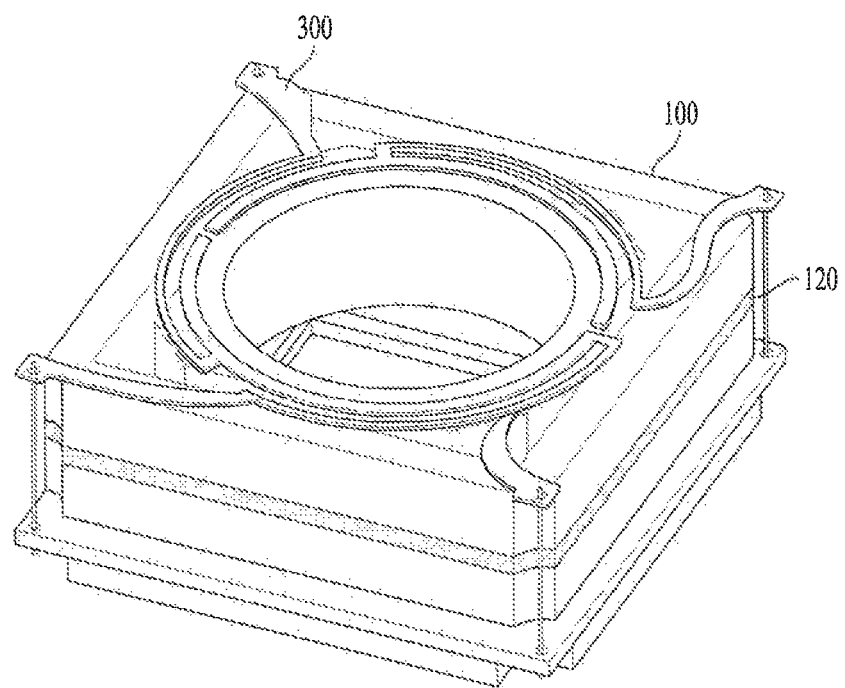

The fixed coil 120, as shown in FIG. 15, may be formed along a circumference of a lateral side between the top side and the bottom side of the holder.

In this case, in the holder of the fixed unit 100, a seat groove 105 may be formed to fix the fixed coil 120 thereto.

In particular, the fixed coil 120 may be disposed in the seat groove 105 of the holder.

Figure 16:
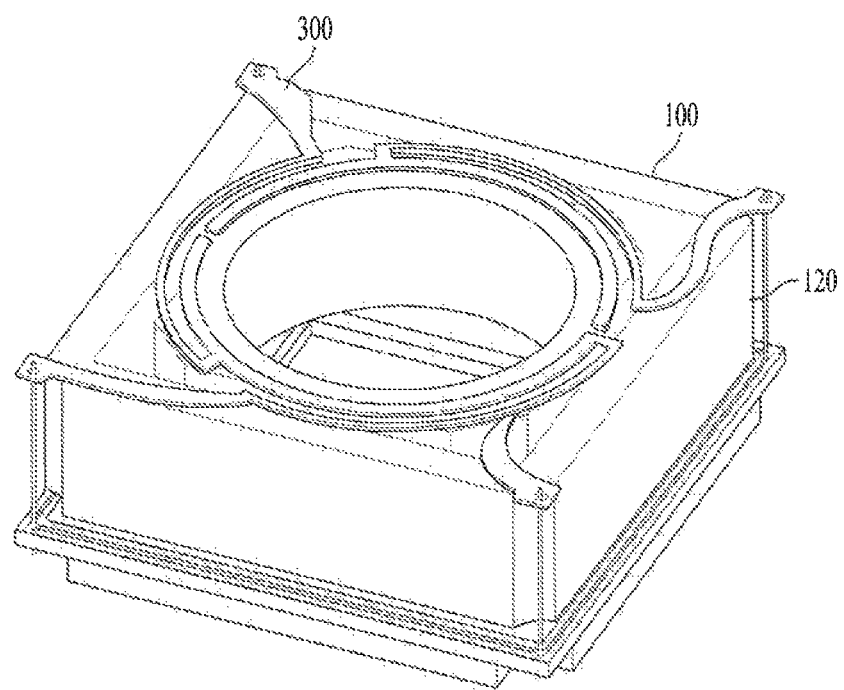
Figure 17:
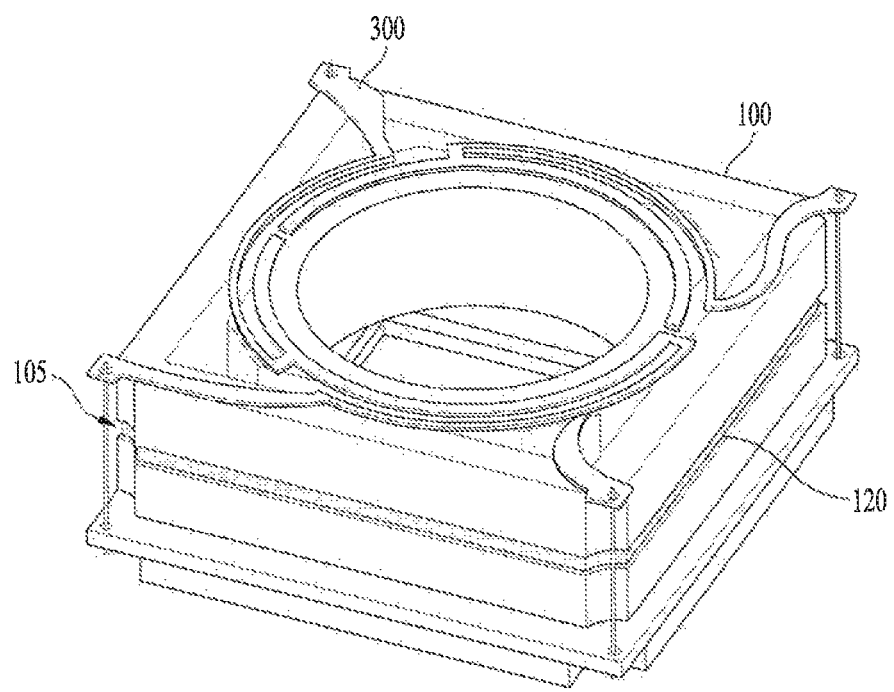

The fixed coil 120, as shown in FIG. 16, may be formed along a circumference of an edge of the bottom side of the holder.

In this case, when the movable unit moves linearly, the fixed coil 120 should be disposed in a manner that a minimum gap between the fixed coil 120 and the movable coil 220 can maintain 0 or more.

The reason for this is described as follows. First of all, if the minimum gap between the fixed coil 120 and the movable coil 220 is smaller than 0, since the current or voltage received by the fixed coil 120 is switched to negative from positive, and vice versa. Hence, the displacement value of the current or voltage according to the distance may not be accurately detected.

If the gap between the fixed coil 120 and the movable coil 220 gets smaller, a variation rate of the current or voltage according to the distance is lowered. Hence, as the non-linearity of an induction signal received by the fixed coil 120 increases, the displacement value of the current or voltage according to the distance may not be accurately detected.

In particular, if the fixed coil 120 and the movable coil 220 overlap each other instrumentally, the linearity of the induction signal received by the fixed coil 120 is degraded and a sign of a code of the induction signal is inverted. Hence, an auto focus error may be generated.

Moreover, the winding number of the fixed coil 120 may be different from that of the movable coil 220.

For instance, the winding number of the fixed coil 120 may be smaller than that of the movable coil 220.

The reason why the winding number of the fixed coil 120 is smaller than that of the movable coil 220 is that an overall size of the camera module can be reduced and that a frequency signal for current or voltage induced to the fixed coil 120 can be amplified.

In some cases, the winding number of the fixed coil 120 may be equal to that of the movable coil 220.

Thus, the reason why the fixed coil is installed in the holder is to downsize the camera module by reducing overall thickness.

Figure 18:
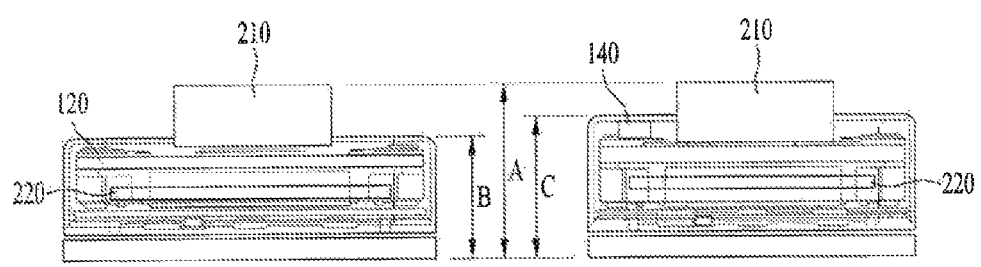
FIG. 18 is a diagram to compare a thickness of a fixed coil disposed camera module to a thickness of a hole sensor disposed camera module.

FIG. 18 is a diagram to compare a thickness of a fixed coil disposed camera module to a thickness of a hole sensor disposed camera module.

Referring to FIG. 18, since a fixed coil 120 is installed on a lateral side of a holder of a fixed part, a camera module according to the present invention has a thickness smaller than that of an existing camera module having a hole sensor 140 installed therein.

In particular, regarding an overall thickness A of a camera module under the same condition, since a camera module thickness B of the present invention is smaller than an existing camera module thickness C, the present invention is advantageous in manufacturing a thin and slim camera module.

Figure 19:
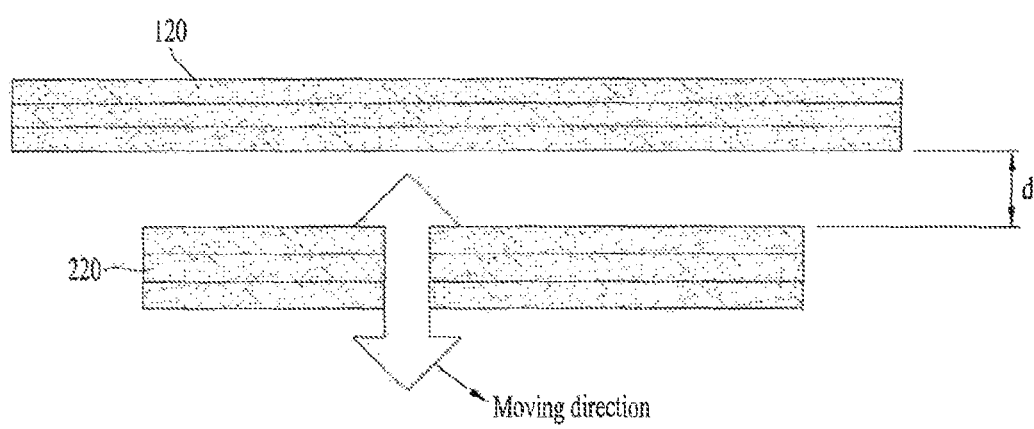
FIG. 19 is a diagram to show a minimum gap between a fixed coil and a movable coil.

FIG. 19 is a diagram to show a minimum gap between a fixed coil and a movable coil.

Referring to FIG. 19, when a movable unit moves linearly, it is necessary for a fixed coil 120 to be disposed in a manner that a minimum gap d between the fixed coil 120 and a movable coil 220 maintains a value equal to or greater than 0.

The reason for this is described as follows. First of all, if the minimum gap d between the fixed coil 120 and the movable coil 220 is smaller than 0, the current or voltage received by the fixed coil 120 is switched to negative from positive, and vice versa. Hence, the displacement value of the current or voltage according to the distance may not be accurately detected.

Moreover, if the gap between the fixed coil 120 and the movable coil 220 gets smaller, a variation rate of the current or voltage according to the distance is lowered. Hence, as the non-linearity of an induction signal received by the fixed coil 120 increases, the displacement value of the current or voltage according to the distance may not be accurately detected.

In particular, if the fixed coil 120 and the movable coil 220 overlap each other instrumentally, the linearity of the induction signal received by the fixed coil 120 is degraded and a sign of a code of the induction signal is inverted. Hence, an auto focus error may be generated.

For instance, as the fixed coil 120 disposed along a circumference of a surface of a top or bottom side of a holder of the fixed unit 100 may be located over the wirings 300 corresponding to springs, when the movable unit linearly moves, the minimum gap between the fixed coil 120 and the movable coil 220 may amount to a thickness value of the wiring 300.

Regarding the fixed coil 120 formed along a circumference of an outer lateral side of the holder, when the movable unit linearly moves, the minimum gap between the fixed coil 120 and the movable coil 220 may be equal to or greater than 0.

Thus, by maintaining the minimum gap between the fixed coil and the movable coil, the present invention can prevent reduction of a displacement value of the current or voltage according to a distance and find an accurate auto focus position without error.

Figure 20:
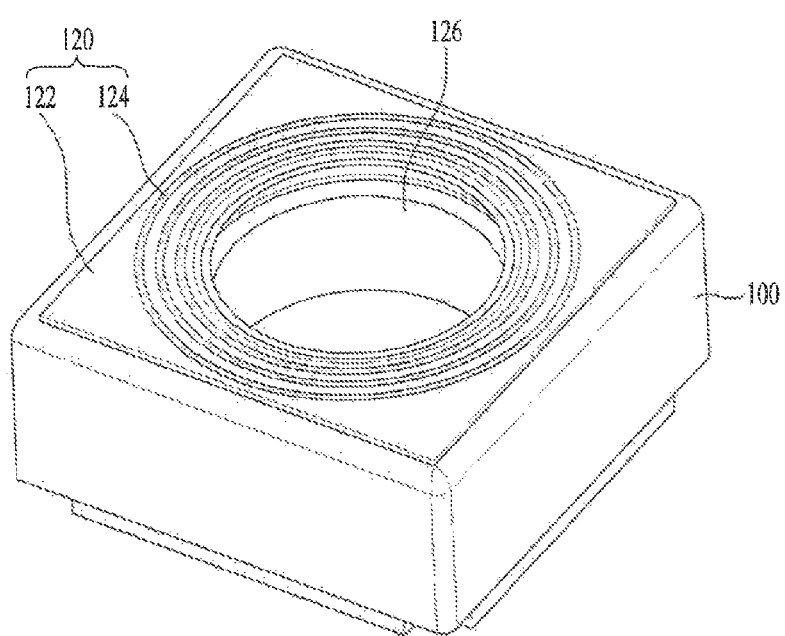
FIG. 20 and FIG. 21 are diagrams for different examples of a fixed coil.
Figure 21:
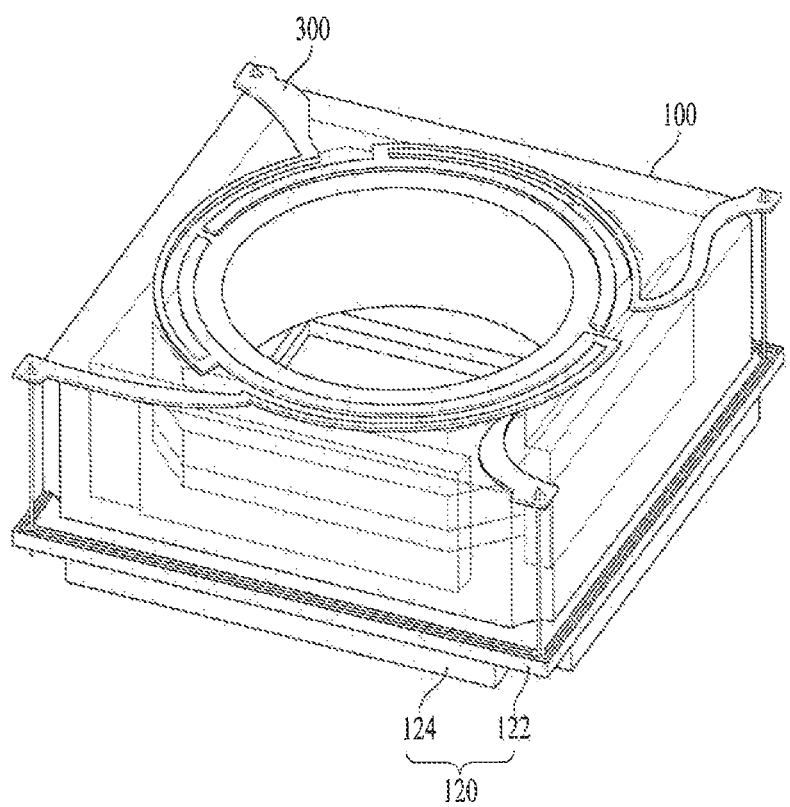

FIG. 20 and FIG. 21 are diagrams for different examples of a fixed coil.

Referring to FIG. 20 and FIG. 21, a fixed coil 120 may include a board 122 disposed on at least one surface of a top side and bottom side of the fixed unit 100 by having a hole 126 formed in a center region and at least one or more coil patterns 124 formed on the board 122.

In this case, when a plurality of the coil patterns 124 are formed, gaps between the coil patterns 124 adjacent to one another may be different from or equal to each other.

Moreover, when a plurality of the coil patterns 124 are formed, widths of the coil patterns 124 may be different from or equal to each other.

The hole 126 of the board 122 may be disposed to oppose a perforated hole of the fixed part 100.

When a circumferential length of the board 122 is smaller than that of the fixed unit 100, as shown in FIG. 20, the coil pattern 124 may be formed along a periphery of the hole 126 of the board 122.

In this case, the coil pattern 124 formed along the periphery of the hole 126 of the board 122 may overlap the top or bottom side of the fixed unit 100.

When a circumferential length of the board 122 is greater than that of the fixed unit 100, as shown in FIG. 21, the coil pattern 124 may be formed along a periphery of the board 122.

In this case, the coil pattern 124 formed along the edge of the hole 126 of the board 122 may be externally exposed without overlapping the top or bottom side of the fixed unit 100.

Thus, the present invention minimizes overall thickness by disposing the fixed coil 120 on a circuit board, thereby being advantageous in manufacturing a thin and slim camera module.

Figure 22:
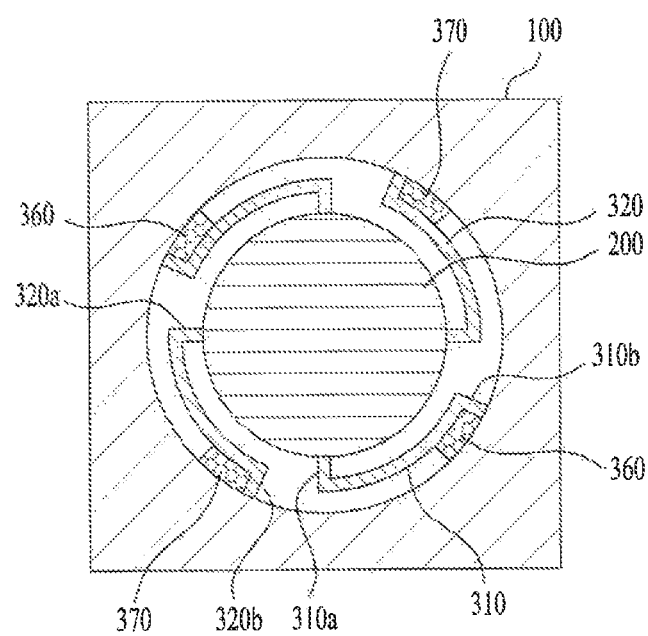
FIG. 22 is a layout of the wiring shown in FIG. 1.

FIG. 22 is a layout of the wiring shown in FIG. 1.

Referring to FIG. 22, the wiring 310/320 is connected between the fixed unit 100 and the movable unit 200, thereby playing a role as a spring configured to provide elastic force according to movement of the movable unit 200.

In this case, the wiring 310/320 may include a first connecting part 310*a*/320*a* connected to the movable unit 200 and a second connecting part 310*b*/320*b* connected to the fixed unit 100.

Generally, as the wiring 310/320 has the natural frequency, after the movable unit 200 has moved, it may cause a time loss for the movable unit 200 to wait for a prescribed time due to the natural frequency of the spring until being stabilized.

Hence, by disposing a damper 360/370 between the wiring 310/320 and the fixed unit 100, it is able to suppress the natural oscillation of the spring.

In particular, a location of the damper 360/370 can be disposed in any region between the wiring 310/320 and the fixed unit 100.

For instance, the damper 360/370 may be disposed adjacent to the second connecting part 310*b*/320*b* connecting the wiring 310/320 and the fixed unit 100.

Hence, by providing the damper between the wiring 310/320 and the fixed unit 100, the natural oscillation of the wiring 310/320 can be suppressed. By reducing hysteresis properties, error of auto focus can be prevented and auto focus time can be reduced.

Figure 23:
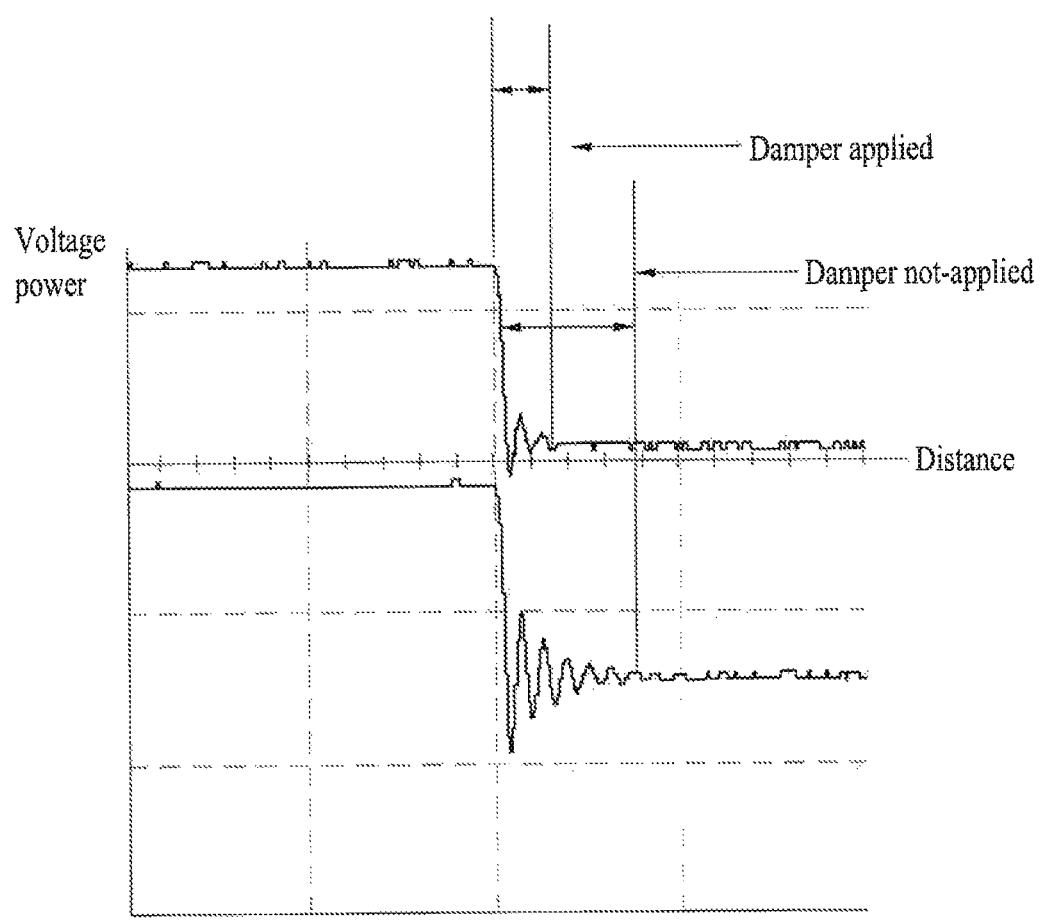
FIG. 23 is a graph of natural oscillation frequency characteristics before and after applying a damper to a wiring.

FIG. 23 is a graph of natural oscillation frequency characteristics before and after applying a damper to a wiring.

Referring to FIG. 23, if a damper is not applied to a wiring, after a movable unit has moved, it takes a long time until the movable unit is stabilized. Hence, an unnecessary time loss may be generated.

Yet, if a damper is applied to a wiring, after the movable unit has moved, the movable unit is stabilized in a very short time. Hence, it is able to remove the unnecessary time loss to wait for the stabilization of the movable unit.

Therefore, by applying the damper to the wiring, the present invention suppresses the natural oscillation of the wiring. By reducing hysteresis properties, the present invention prevents error of auto focus and reduces auto focus time.

Figure 24:
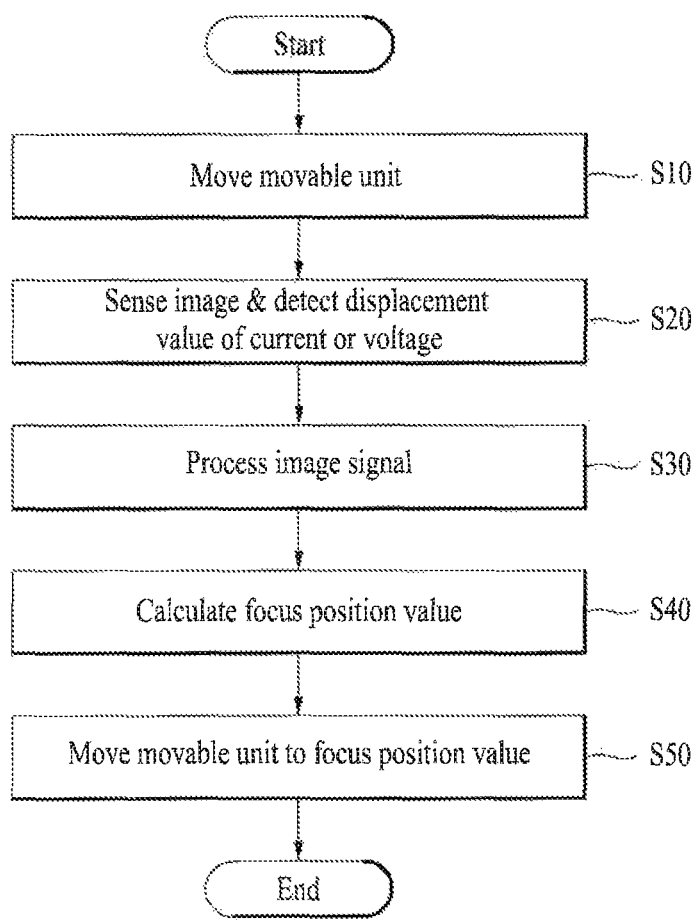
FIG. 24 and FIG. 25 are flowcharts to describe an auto focus method of a camera module according to the present invention.
Figure 25:
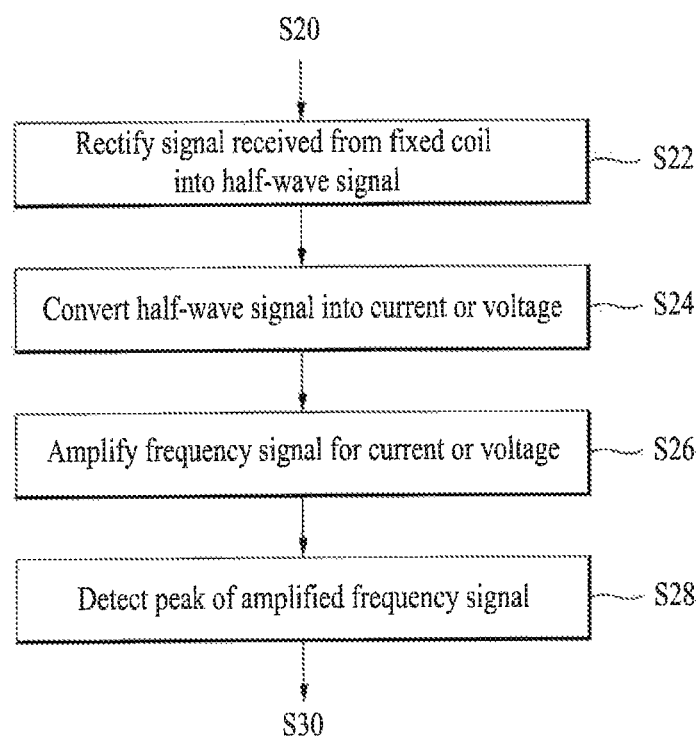

FIG. 24 and FIG. 25 are flowcharts to describe an auto focus method of a camera module according to the present invention.

Referring to FIG. 24 and FIG. 25, a drive control unit moves a movable unit for auto focus [S10].

In particular, a drive signal is applied to a movable coil. In this case, the drive signal applied to the movable coil may include a drive signal having a high frequency signal carried on a low frequency signal.

The drive control unit generates a low frequency signal as a drive signal for moving the movable unit, synthesizes the drive signal (i.e., low frequency signal) with a random high frequency signal, and is then able to move the movable unit by applying the drive signal synthesized with the high frequency signal to the movable coil.

In this case, the low frequency signal of the drive signal is a signal component for moving the movable unit. The high frequency signal synthesized in the drive signal is a signal component for sensing a moving position of the movable unit and may include a frequency signal higher than the drive signal.

Subsequently, an image sensor senses an image incident through a lens of the movable unit and a detecting unit detects a displacement value of current or voltage according to a distance between the movable coil and a fixed coil [S20].

In this case, the detected displacement value of the current or voltage may include a strength variation of the high frequency signal included in the drive signal.

Moreover, in the step of detecting the displacement value of the current or voltage according to the distance between the movable coil and the fixed coil, a half-wave rectifying unit of the detecting unit rectifies the frequency signal for the current or voltage received from the fixed coil into a half-wave signal [S22].

The converting unit of the detecting unit converts the rectified half-wave signal into current or voltage [S24]. And, an amplifying unit of the detecting unit amplifies a frequency signal for the converted current or voltage [S26].

And, a peak detecting unit of the detecting unit is able to detect a displacement of the current or voltage by detecting and outputting a peak of the amplified frequency signal [S28].

Subsequently, an image signal processing unit processes an image signal sensed by an image sensor [S30].

Thereafter, a focus position calculating unit calculates an optimal position value by receiving the image signal processed by the image signal processing unit and the displacement of the current or voltage, which is detected by the detecting unit, according to the distance between the movable coil and the fixed coil [S40].

Finally, the drive control unit can perform an auto focus by moving the movable unit to the calculated optimal focus position value [S50].

According to another embodiment, an auto focus method of the present invention may include a step of checking a preset auto focus scheme, a step of if the preset auto focus scheme is a contrast focus scheme, moving a movable unit by applying a drive signal to a movable coil, a step of sensing an image incident through a lens of the movable unit, a step of detecting a displacement value of current or voltage according to a distance between the movable coil and a fixed coil, a step of processing a sensed image signal, a step of calculating a focus position value from the processed image signal and the detected displacement value of the current or voltage, and a step of moving the movable unit to the calculated focus position value.

In the step of checking the preset auto focus scheme, if the preset auto focus scheme is a laser focus scheme, the present invention may include the steps of sensing a distance from a subject to capture, calculating the focus position value based on the sensed distance from the subject, and moving the movable unit to the calculated focus position value.

In the step of checking the preset auto focus scheme, if the preset auto focus scheme is a hybrid focus scheme, the present invention may include the steps of sensing external brightness, checking whether the sensed external brightness is equal to or greater than a reference value, moving the movable unit by applying a drive signal to the movable coil if the sensed external brightness is equal to or greater than the reference value, sensing the image incident through the lens of the movable unit according to the movement of the movable unit and detecting the displacement value of the current or voltage according to the distance between the movable coil and the fixed coil, processing the sensed image signal, calculating the focus position value from the processed image signal and the detected displacement value of the current or voltage, and moving the movable unit to the calculated focus position value.

In the step of checking whether the sensed external brightness is equal to or greater than the reference value, if the sensed external brightness is not equal to or greater than the reference value, sensing a distance from a subject to capture, calculating the focus position value based on the sensed distance from the subject, and moving the movable unit to the calculated focus position value.

Accordingly, the present invention can find an auto focus position quickly and accurately in a manner of disposing a fixed coil to a fixed unit, disposing a movable coil to a moving unit, and then detecting a displacement value of current or voltage according to a distance between the fixed coil and the movable coil.

The present invention can simplify an electrical connection between a coil including a fixed coil and a movable coil and a circuit board using a spring connected between a fixed unit and a movable unit.

The present invention can downsize a camera module in a manner of reducing overall thickness of the camera module by disposing a fixed coil within a holder groove of a fixed unit or by disposing a fixed coil within a circuit board.

The present invention maintains a minimum interval between a movable coil and a fixed coil, thereby preventing a reduction of a displacement value of current or voltage according to a distance and finding an accurate auto focus position.

The present invention performs auto focus by one of a contrast focus scheme, a laser focus scheme and a hybrid focus scheme according to a user request or external brightness, thereby providing a user with convenience.

And, the present invention reduces natural oscillation of a spring by disposing a damper between the spring and a fixed unit, thereby preventing error of auto focus and reducing auto focus time.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
a fixed unit having a hole formed therein;
a movable unit including at least one lens, the movable unit being configured to move inside the hole of the fixed unit;
a movable coil disposed on a surface of the movable unit; and
a fixed coil disposed on a surface of the fixed unit, the fixed coil being configured to generate an induced current or voltage by electromagnetic induction between the movable coil and the fixed coil, the induced current or voltage being varied according to a distance between the movable coil and the fixed coil,
wherein the movable coil receives a driving current or voltage via a first wiring and a second wiring for moving the movable unit, and
wherein the fixed coil outputs the induced current or voltage via a third wiring and a fourth wiring.

2. The camera module of claim 1, wherein at least one of the first to fourth wirings comprises a spring configured to provide an elastic force according to a movement of the movable unit by being connected between the fixed unit and the movable unit.

3. The camera module of claim 1, further comprising a power supply unit configured to provide the driving current or voltage to the movable coil,
wherein the first wiring is electrically connected to a positive terminal of the power supply unit and the movable coil, and the second wiring is electrically connected to a negative terminal of the power supply unit and the movable coil.

4. The camera module of claim 1, further comprising an auto focus control unit configured to determine a position of the movable unit for an autofocus of the camera module based on the induced current or voltage generated by electromagnetic induction,
wherein the third wiring is electrically connected to a positive terminal of the auto focus control unit and the fourth wiring is electrically connected to a negative terminal of the auto focus control unit.

5. The camera module of claim 4, wherein the auto focus control unit is further configured to:
calculate a focus position value based on the induced current or voltage received from the fixed coil; and
move the movable unit according to the calculated focus position value.

6. The camera module of claim 5, wherein the driving current or voltage has a low frequency signal and a high frequency signal.

7. The camera module of claim 6, wherein the low frequency signal is a signal component for moving the movable unit and wherein the high frequency signal is a signal component for determining the position of the movable unit.

8. The camera module of claim 5, further comprising:
an image sensor configured to sense an image incident through at least one lens of the movable unit; and
an image signal processing unit configured to process an image signal sensed by the image sensor,
wherein the auto focus control unit calculates the focus position value based on the image signal processed by the image signal processing unit and the induced current or voltage generated by electromagnetic induction.

9. The camera module of claim 5, further comprising a distance sensor configured to sense a distance from a subject to be photographed, wherein the auto focus control unit calculates the focus position value based on the distance from the subject sensed by the distance sensor.

10. The camera module of claim 5, further comprising:
a distance sensor configured to sense a distance from a subject to be photographed;
an image sensor configured to sense an image incident through at least one lens of the movable unit; and
an image signal processing unit configured to process an image signal sensed by the image sensor,
wherein the auto focus control unit calculates the focus position value based either on the image signal processed by the image signal processing unit and the induced current or voltage received from the fixed coil or on the distance from the subject sensed by the distance sensor.

11. The camera module of claim 10, further comprising an illumination sensor configured to sense external brightness,
wherein if the external brightness sensed by the illumination sensor is equal to or greater than a reference value, the auto focus control unit calculates the focus position value based on the image signal processed by the image signal processing unit and the induced current or voltage received from the fixed coil, and
wherein if the external brightness sensed by the illumination sensor is smaller the reference value, the auto focus control unit calculates the focus position value based on the distance from the subject sensed by the distance sensor.

12. The camera module of claim 11, wherein if the external brightness sensed by the illumination sensor is smaller than the reference value, the auto focus control unit provides a notification message, which notifies that a contrast focus scheme of calculating a focus position using an image contrast of the subject is switched to a laser focus scheme of calculating a focus position using the distance from the subject, to a display screen.

13. The camera module of claim 11, wherein if receiving a reference value setting request signal for the external brightness, the auto focus control unit provides a reference value setting window to a display screen and wherein if a reference value setting complete signal for the external brightness is received through the reference value setting window, the auto focus control unit changes the reference value for the external brightness according to a setting completed setup value.

14. The camera module of claim 10, wherein if receiving an auto focus setting request signal, the auto focus control unit provides an auto focus setting window to a display screen and wherein if receiving an auto focus setting complete signal through the auto focus setting window, the auto focus control unit calculate the focus position value according to a setting-completed auto focus scheme.

15. The camera module of claim 1, wherein the fixed unit comprises a holder having the hole formed in a center region and wherein the fixed coil is formed along a circumference of a surface of at least one of a top side of the holder, a bottom side of the holder and an outer lateral side between the top side and the bottom side.

16. The camera module of claim 15, wherein a seat groove is formed in the holder to fix the fixed coil thereto and wherein the fixed coil is disposed in the seat groove of the holder.

17. The camera module of claim 15, wherein the fixed coil is formed along a circumference of an outer lateral side of the holder and wherein when the movable unit moves, the fixed coil is disposed in a manner that a minimum gap between the fixed coil and the movable coil maintains zero or more.

18. The camera module of claim 1, the fixed coil comprising:
a board disposed on at least one surface of a top side and a bottom side of the fixed unit by having a hole formed in a center region; and
at least one coil pattern formed on the board.

19. The camera module of claim 18, wherein if a circumferential length of the board is smaller than that of the fixed unit, the coil pattern is formed along a periphery of the hole of the board and wherein if the circumferential length of the board is greater than that of the fixed unit, the coil pattern is formed along a periphery of the board.

20. The camera module of claim 18, wherein the coil pattern formed along a periphery of the hole of the board overlaps the top or bottom side of the fixed unit and wherein the coil pattern formed along an edge of the hole of the board is externally exposed without overlapping the top or bottom side of the fixed unit.

21. The camera module of claim 1, wherein the movable coil is disposed on an outer surface of the movable unit.

22. A camera module comprising:
a fixed unit having a hole formed therein;
a movable unit including at least one lens, the movable unit configured to move;
a movable coil disposed on a surface of the movable unit;
a fixed coil disposed on a top surface of the fixed unit, the fixed coil configured to generate an induced current or voltage by electromagnetic induction between the movable coil and the fixed coil, the induced current or voltage being varied according to a distance between the movable coil and the fixed oil,
wherein the movable coil receives a driving current or voltage via a first wiring and a second wiring for driving the movable unit, wherein the fixed coil outputs the induced current or voltage via a third wiring and a fourth wiring by being electrically connected to the third wiring and the fourth wiring; and
a controller configured to determine a position of the movable unit for an auto focus of the camera module based on the induced current or voltage.

23. The camera module of claim 22, wherein the driving current or the voltage comprises a low frequency signal and a high frequency signal.

24. The camera module of claim 23, wherein a bandwidth of the high frequency signal is between 100 kHz and 5 MHz.

25. The camera module of claim 23, wherein the low frequency signal includes a signal component for moving the movable unit.

26. The camera module of claim 22, wherein at least one of the first to fourth wirings comprises a spring configured to provide an elastic force according to a movement of the movable unit by being connected between the fixed unit and the movable unit.

27. A camera module comprising:
a fixed unit having a hole formed therein;
a movable unit including at least one lens, the movable unit configured to move inside the hole of the fixed unit;
a movable coil disposed on a surface of the movable unit; and
a fixed coil configured to generate an induced current or voltage by electromagnetic induction between the movable coil and the fixed coil, the induced current or voltage being varied according to a distance between the movable coil, and the fixed coil.
wherein the movable coil receives a driving current or voltage via a first wiring and a second wiring for moving the movable unit, and
wherein the fixed coil outputs the induced current or voltage via a third wiring and a fourth wiring,
wherein at least one of the first to fourth wirings comprises a spring configured to provide an elastic force according to a movement of the movable unit by being connected between the fixed unit and the movable unit.

28. A camera module comprising:
a fixed unit having a hole formed therein;
a movable unit including at least one lens, the movable unit configured to move inside the hole of the fixed unit;
a movable coil disposed on a surface of the movable unit; and
a fixed coil configured to generate an induced current or voltage by electromagnetic induction between the movable coil and the fixed coil, the induced current or voltage being varied according to a distance between the movable coil and the fixed coil,
wherein the movable coil receives a driving current or voltage via a first wiring and a second wiring for moving the movable unit, and
wherein the fixed coil outputs the induced current or voltage via a third wiring and a fourth wiring,
wherein at least one of the first to fourth wirings comprises a spring configured to provide an elastic force according to a movement of the movable unit by being connected between the fixed unit and the movable unit, and
wherein the driving current or the voltage comprise a low frequency signal and a high frequency signal and wherein the low frequency signal is for moving the movable unit and the high frequency signal is for determining a position of the movable unit for an auto focus of the camera module.

* * * * *